(12) United States Patent  (10) Patent No.: US 9,340,051 B2
Kimura  (45) Date of Patent: May 17, 2016

(54) PRINTING APPARATUS, METHOD FOR CONTROLLING PRINTING APPARATUS, AND STORAGE MEDIUM FOR TEST PRINTING

(71) Applicant: CANON KABUSHIKI KAISHA, Tokyo (JP)

(72) Inventor: Hiromi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/699,901

(22) Filed: Apr. 29, 2015

(65) Prior Publication Data

US 2015/0314622 A1 Nov. 5, 2015

(30) Foreign Application Priority Data

May 1, 2014 (JP) ................................ 2014-094765

(51) Int. Cl.
*B41J 29/393* (2006.01)
(52) U.S. Cl.
CPC ..................................... *B41J 29/393* (2013.01)

(58) Field of Classification Search
USPC ............................................ 347/5, 14–16, 19
See application file for complete search history.

(56) References Cited

U.S. PATENT DOCUMENTS

| 8,506,034 B2 * | 8/2013 | Usuda et al. ..................... 347/14 |
| 2007/0189789 A1 * | 8/2007 | Suzuki ............................ 399/49 |

FOREIGN PATENT DOCUMENTS

JP 62-268660 A 11/1987
JP 2005-67087 A 3/2005

* cited by examiner

*Primary Examiner* — Hai C Pham
(74) *Attorney, Agent, or Firm* — Canon USA Inc. IP Division

(57) ABSTRACT

When test print is performed for printing an image on a transparent sheet, an inexpensive sheet is used instead of the transparent sheet. A method for controlling a printing apparatus includes receiving a setting of the test print, and performing control to print the image as a mirror image on a second side of the transparent sheet if the setting of the test print is not received, and performing control to feed an alternative sheet instead of the transparent sheet to print the image as a normal image on a first side of the alternative sheet if the setting of the test print is received.

6 Claims, 19 Drawing Sheets

TEST PRINT IS SET.
DO YOU WANT TO CHANGE SHEET?

| SETTINGS | DETAILS |
|---|---|
| SHEET TYPE | TRANSPARENT SHEET |
| SHEET SIZE | A4 |

CHANGE SETTINGS

TRANSPARENT SHEET IS SELECTED.
YOU CAN CHANGE TO ANOTHER SHEET.

PRINT  CANCEL

SELECT SHEET.

SET SHEET SIZE

- A4
- A3
- LETTER
- LEGAL

SET SHEET TYPE

- TRANSPARENT SHEET
- PLAIN PAPER 65-75g/m²
- PLAIN PAPER 75-95g/m²
- COATED PAPER 90-110g/m²
- COATED PAPER 110-125g/m²

OK  CANCEL

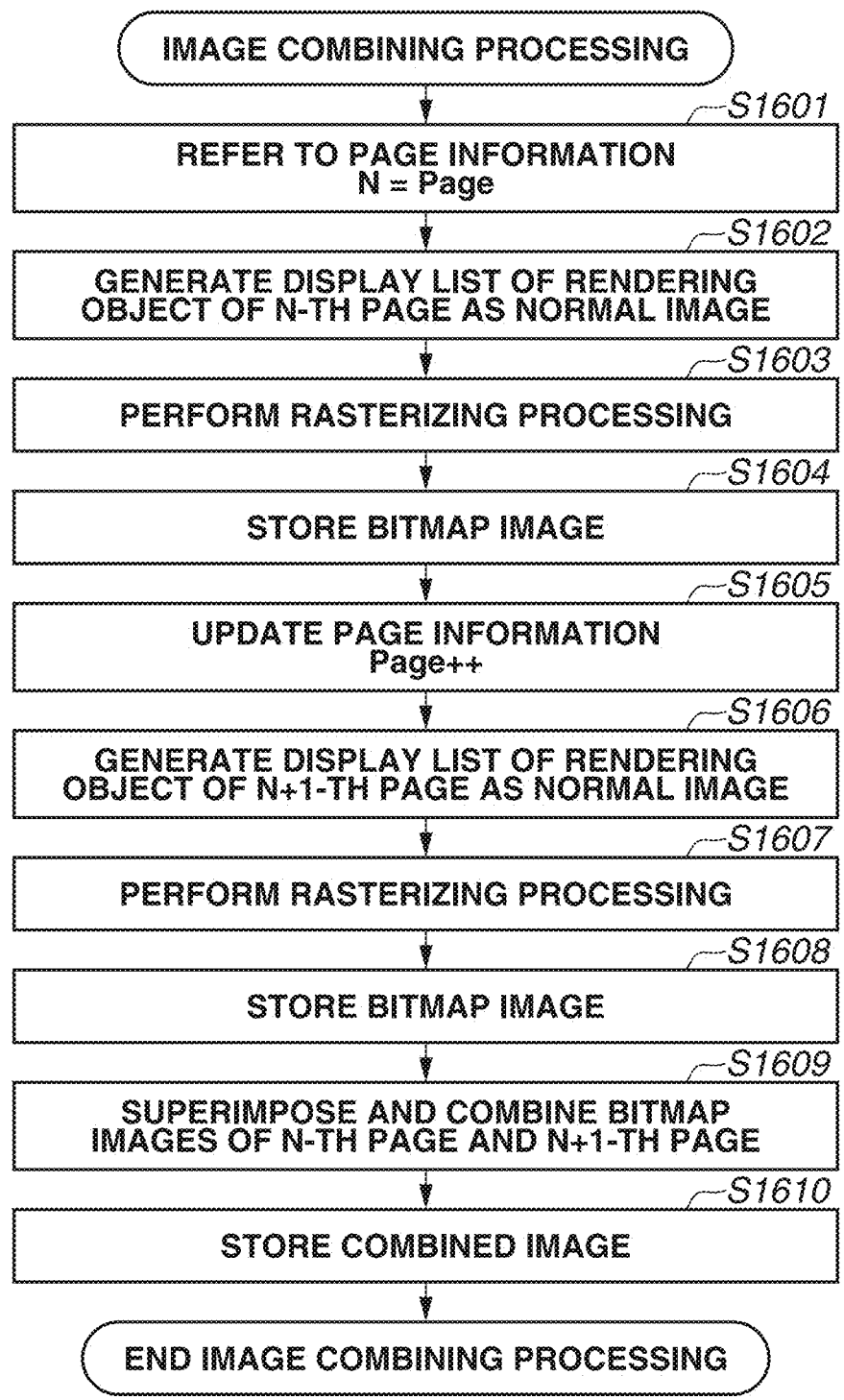

PRINTING APPARATUS, METHOD FOR CONTROLLING PRINTING APPARATUS, AND STORAGE MEDIUM FOR TEST PRINTING

BACKGROUND OF THE INVENTION

1. Field of the Invention

The present invention relates to a printing apparatus, a method for controlling the printing apparatus, and a storage medium.

2. Description of the Related Art

There is disclosed a technique that provides a printing apparatus with a mode switching unit for forming an image as a normal image or as a mirror image according to a sheet type. In other words, the printing apparatus can determine a sheet type specified for an input print job to form an image according to a set recording mode (refer to Japanese Patent Application Laid-Open No. 62-268660).

Further, there is disclosed a technique that allows a printing apparatus to, when printing mirror images on overhead projector (OHP) films, reverse the page processing order to maintain the page order even when successively printing a plurality of pages on the OHP films.

Further, another disclosed technique allows a printing apparatus to, at the time of interleave printing, form an image to be recorded on an OHP film as a mirror image to print the image on a back side of the OHP film, while forming an image to be recorded on an interleave sheet as a normal image to print the image on a front side of the interleave sheet. As a result, a user can obtain a product as expected even at the time of the interleave printing (refer to Japanese Patent Application Laid-Open No. 2005-67087).

When a highly value-added product is created with a special recording medium such as a transparent sheet, test print may be performed several times to allow an operator to check before starting processing for creating the product whether the operator can obtain the product as intended. Using a special recording medium for the test print leads to an increase in failure cost according to how many times a fine adjustment is performed by the test print. Further, when the product is discarded, such test print also requires a process for, for example, separating the special recording medium and a general recording medium (e.g., plain paper), resulting in a reduction in the work efficiency.

SUMMARY OF THE INVENTION

According to an aspect of the present invention, a printing apparatus includes a reception unit configured to receive a setting of test print, and a control unit configured to perform control to print an image as a mirror image on a second side of a transparent sheet if the reception unit does not receive the setting of the test print, and to perform control to feed an alternative sheet instead of the transparent sheet to print the image as a normal image on a first side of the alternative sheet if the reception unit receives the setting of the test print.

Further features of the present invention will become apparent from the following description of exemplary embodiments with reference to the attached drawings.

BRIEF DESCRIPTION OF THE DRAWINGS

FIGS. 13A and 13B illustrate examples of user interface (UI) screens.

FIG. 16 is a flowchart illustrating a method for controlling the printing apparatus.

DESCRIPTION OF THE EMBODIMENTS

Next, exemplary embodiments of the present invention will be described with reference to the drawings. However, the exemplary embodiments that will be described below do not limit the present invention according to the claims, and not all of combinations of features that will be described in the exemplary embodiments are necessarily essential to a solution of the present invention.

<Description of System Configuration>
<Block Diagram of Configuration Example of PDL Rendering Processing Unit>

Figure 1:
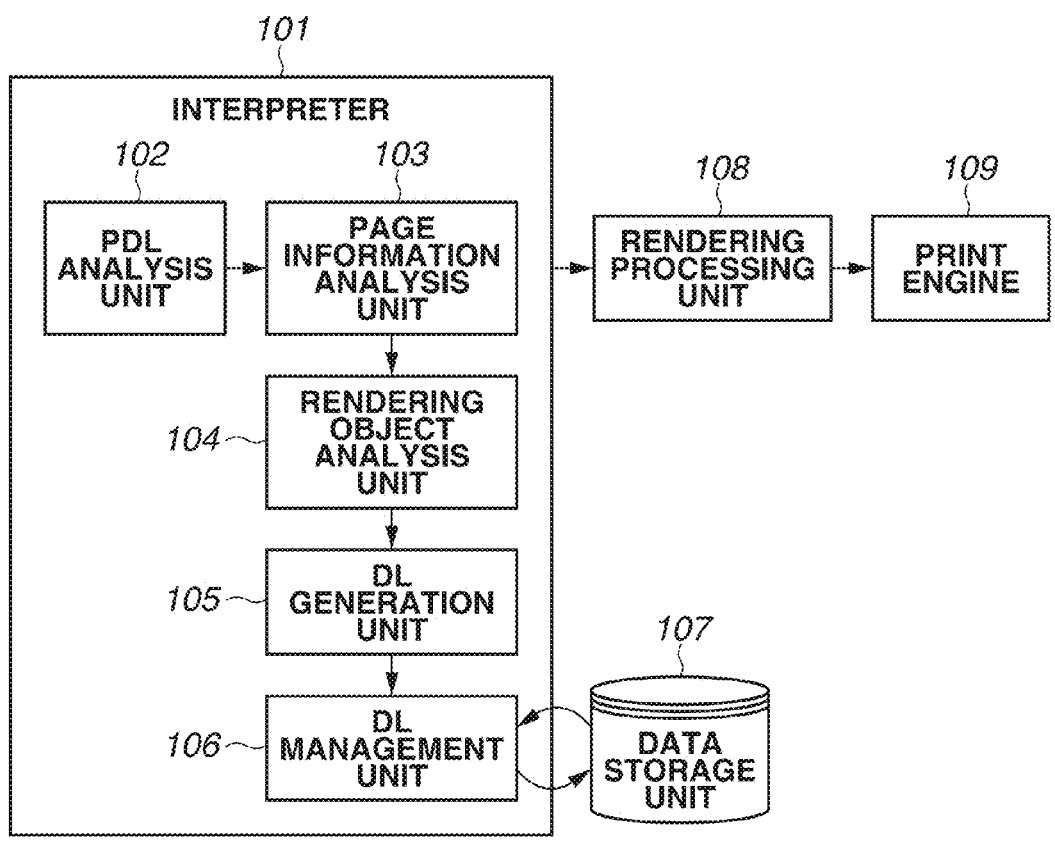
FIG. 1 is a block diagram illustrating a configuration of a printing apparatus (image forming apparatus).

FIG. 1 is a block diagram illustrating a configuration of a printing apparatus according to a first exemplary embodiment of the present invention. A rendering processing unit, which will be described below, performs processing for rasterizing each piece of object information and storing it as raster image data in a memory (not illustrated) to reproduce, for example, vector information such as text, line drawings, and graphics described in page description language (PDL) and bitmap information simultaneously as a page. In the present exemplary embodiment, an image forming apparatus that performs processing of multiple functions is taken as an example of the printing apparatus.

A PDL rendering processing unit includes two units, an interpreter 101 and a rendering processing unit 108. The interpreter 101 includes a PDL analysis unit 102 that linguistically analyzes PDL data, a page information analysis unit 103 that analyzes page information contained in the PDL data, and a rendering object analysis unit 104 that analyzes a rendering object contained in the PDL data. Further, the interpreter 101 includes a display list (DL) generation unit 105 that generates an intermediate file called a display list from the rendering object.

Further, the interpreter 101 includes a DL management unit 106 that can store and read out DL data into and from a data storage unit 107 in a temporary storage device such as a memory and a hard disk drive (HDD), when the rendering object and a font can be cached and reused.

The PDL analysis unit 102 can analyze various kinds of input PDL data. For example, the PostScript (registered trademark) language provided by Adobe Systems Incorporated, and Printer Control Language (PCL) (registered trademark) provided by Hewlett-Packard (HP) Company are famous as the format of the PDL data. Further, the PDL analysis unit 102 can also analyze Portable Document Format (PDF) (registered trademark) provided by Adobe Systems Incorporated, which is a document format designed for a document.

Besides these formats, the PDL analysis unit 102 can process a format designed for Variable Data Printing (VDP), such as Personalized Print Markup Language (PPML) and PDF/Variable Data and Transactional Printing (VT). The PDL analysis unit 102 can also process an image compression format such as Joint Photographic Experts Group (JPEG) and Tagged Image File Format (TIFF).

The rendering processing unit 108 includes a color management module (CMM) (not illustrated) that performs color matching on the display list, and a DL rendering unit (not illustrated) that renders the display list into bitmap data (raster image data).

A print engine 109 reads out the bitmap data generated by the rendering processing unit 108, and performs print processing. The details thereof will be described in <Print Processing Unit of Image Forming Apparatus> with reference to FIG. 5.

<Configuration of Control Unit>

Figure 2:
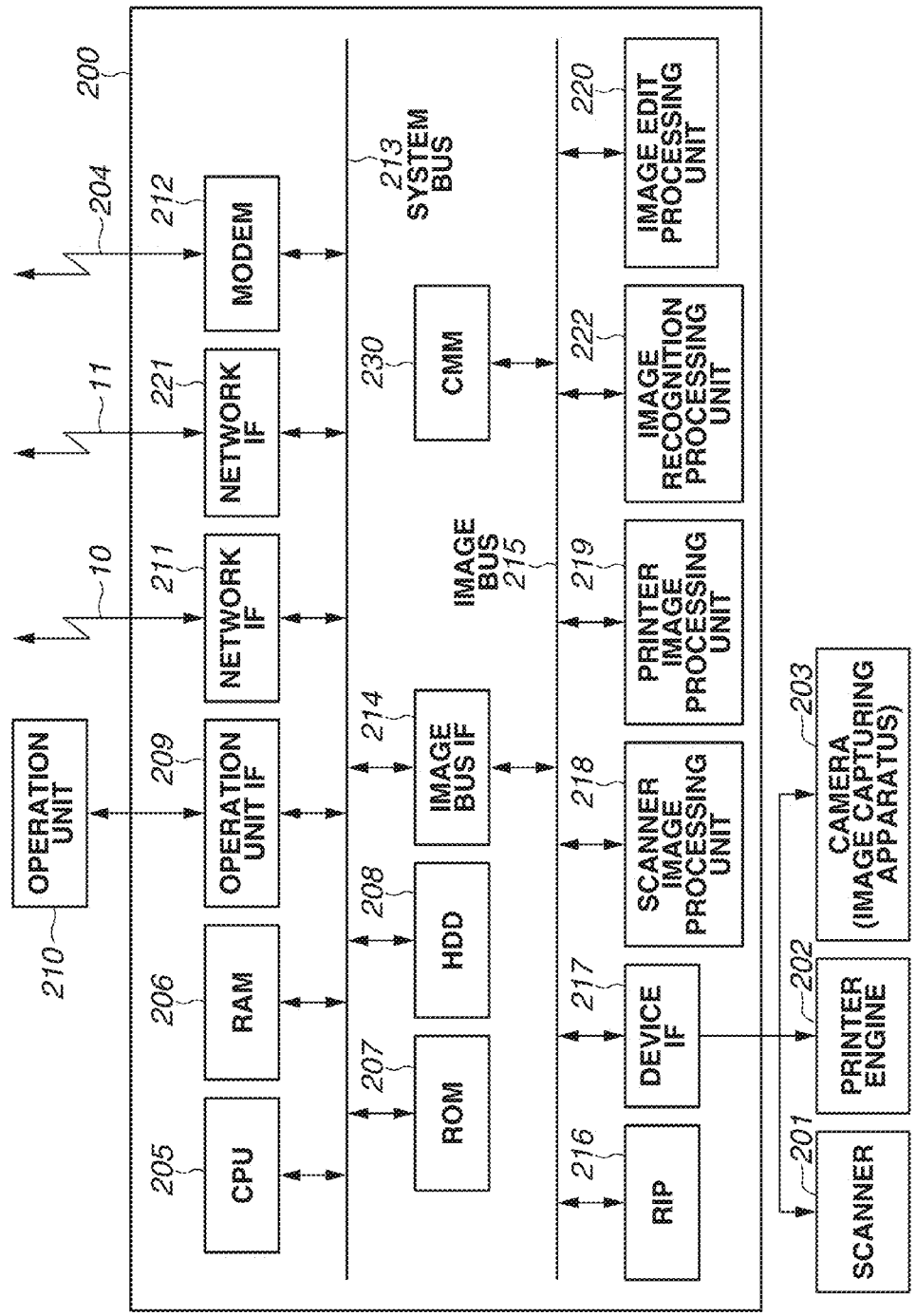
FIG. 2 is a block diagram illustrating a configuration of an image forming apparatus controller.

FIG. 2 is a block diagram illustrating a configuration example of a control unit (controller) of the image forming apparatus according to the present exemplary embodiment.

Referring to FIG. 2, a control unit 200 is connected to a scanner 201 serving as an image input device, and a printer engine 202 serving as an image output device, and performs control to read and print out image data. Further, the control unit 200 is connected to local area networks (LANs) 10 and 11 and a public telephone line 204, thereby performing control to input and output image information and device information via the LANs 10 and 11.

A central processing unit (CPU) 205 controls the entire part of the image forming apparatus. A random access memory (RAM) 206 is a system work memory that allows the CPU 205 to operate, and is also an image memory for temporarily storing input image data. Further, a read only memory (ROM) 207 is a boot ROM, and stores a boot program of a system. An HDD 208 stores system software for various kinds of processing, input image data, and the like.

An operation unit interface (I/F) 209 is an interface unit to an operation unit 210 including a display screen that can display image data and the like, and outputs operation screen data to the operation unit 210. Further, the operation unit I/F 209 serves as transmitting, to the CPU 205, information input by an operation via the operation unit 210.

Network interfaces 211 and 221 are connected to the LANs 10 and 11 via, for example, network interface cards (NICs), respectively, and input and output information between the image forming apparatus and external apparatuses. The present exemplary embodiment describes the case in which the network interfaces are limited to two, but the present exemplary embodiment also includes a case using three or more network interfaces. Further, a modem 212 is connected to the public telephone line 204, and inputs and outputs information between the image forming apparatus and an external apparatus. These units are disposed on a system bus 213.

An image bus I/F 214 is an interface for connecting the system bus 213 to an image bus 215 that transfers image data at a high speed, and is a bus bridge that converts a data structure.

A raster image processor 216, a device I/F 217, a scanner image processing unit 218, a printer image processing unit 219, an image edit processing unit 220, an image recognition processing unit 222, and a color management module 230 are connected on the image bus 215. The raster image processor (RIP) 216 rasterizes a PDL code and vector data (described below) into an image. The device I/F 217 is connected to the scanner 201, the printer engine 202, and an image capturing apparatus 203, and converts image data synchronously or asynchronously.

Further, the scanner image processing unit 218 performs various kinds of processing such as correction, processing, and editing on the image data input from the scanner 201. The printer image processing unit 219 performs processing such as correction and resolution conversion according to the printer engine 202, on the image data to be printed and output.

The image edit processing unit 220 performs various kinds of image processing such as rotation of image data, image data compression/decompression processing, image enlargement/reduction processing, and image combining processing. The image recognition processing unit 222 performs, on the image data input from the image capturing device 203, processing for determining whether the image data is a recognition code such as a two-dimensional code and analyzing coded information contained in the recognition code.

The CMM 230 is a dedicated hardware module that performs color conversion processing (also referred to as color space conversion processing) on image data based on a profile and calibration data. The profile is information like a function used to convert color image data expressed by a device-dependent color space into a device-independent color space (for example, Luminance, a, and b (Lab)). The calibration data is used to correct color reproduction characteristics of the scanner 201 or the printer engine 202 in a color multifunctional peripheral.

<Configuration of Controller Software>

Figure 3:
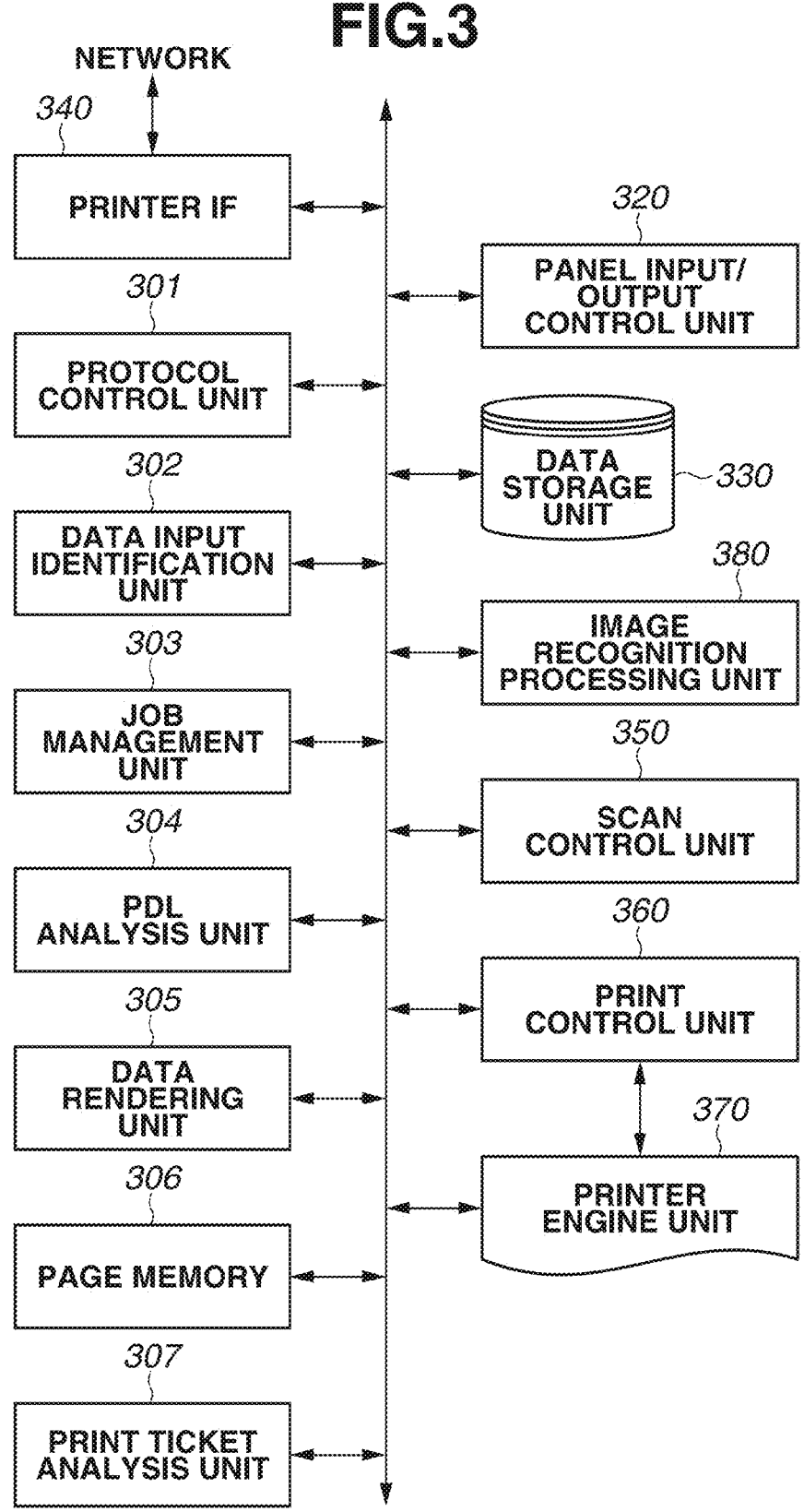
FIG. 3 is a block diagram illustrating a configuration of controller software.

FIG. 3 is a block diagram illustrating a configuration of controller software that controls an operation of the image forming apparatus according to the present exemplary embodiment.

Referring to FIG. 3, a printer interface 340 is a unit for an input and an output from and to an external apparatus. A protocol control unit 301 communicates with an external apparatus by analyzing and transmitting a network protocol. A plurality of printer interfaces and protocol control units can be prepared so that a different printer interface and a different protocol control unit correspond to each of the connected NICs, or the image forming apparatus can also be configured so that a single control unit processes inputs from the plurality of NICs.

A data input identification unit 302 identifies, among the plurality of connected networks, the network from which a print job input via the printer interface 304 is input.

A job management unit 303 manages the print job input from the printer IF 340, and divides the print job and processes device control information according to print settings added to the print job.

A PDL analysis unit 304 analyses PDL, and converts PDL data into an intermediate code (display list) in a format that can be processed more easily. The intermediate code generated by the PDL analysis unit 304 is transferred to and processed by a data rendering unit 305. The data rendering unit 305 rasterizes the intermediate code into bitmap data, and the bitmap data is sequentially rendered into a page memory 306. The page memory 306 is a volatile memory that temporarily stores the bitmap data generated by the data rendering unit 305. A panel input/output control unit 320 controls an input and an output from and to an operation panel.

A data storage unit 330 stores various data files input into the image forming apparatus, such as a print job input from the printer I/F 340 and a scan job input from the scanner 201, and is realized by a non-volatile secondary storage device such as a static RAM (SRAM) and a hard disk. A scan control unit 350 performs various kinds of processing, such as correction, processing, and editing, on the image data input from the scanner 201. An image recognition processing unit 380 performs, on the image data input from the image capturing device 203, processing for determining whether the image data is a recognition code such as a two-dimensional code and analyzing coded information contained in the recognition code.

A print control unit 360 converts the content of the page memory 306 into a video signal, and performs image transfer to a printer engine unit 370. The printer engine unit 370 is a print mechanism unit for forming a visible image on a recording sheet from the received video signal.

<Image Forming Apparatus Control Unit>

Figure 4:
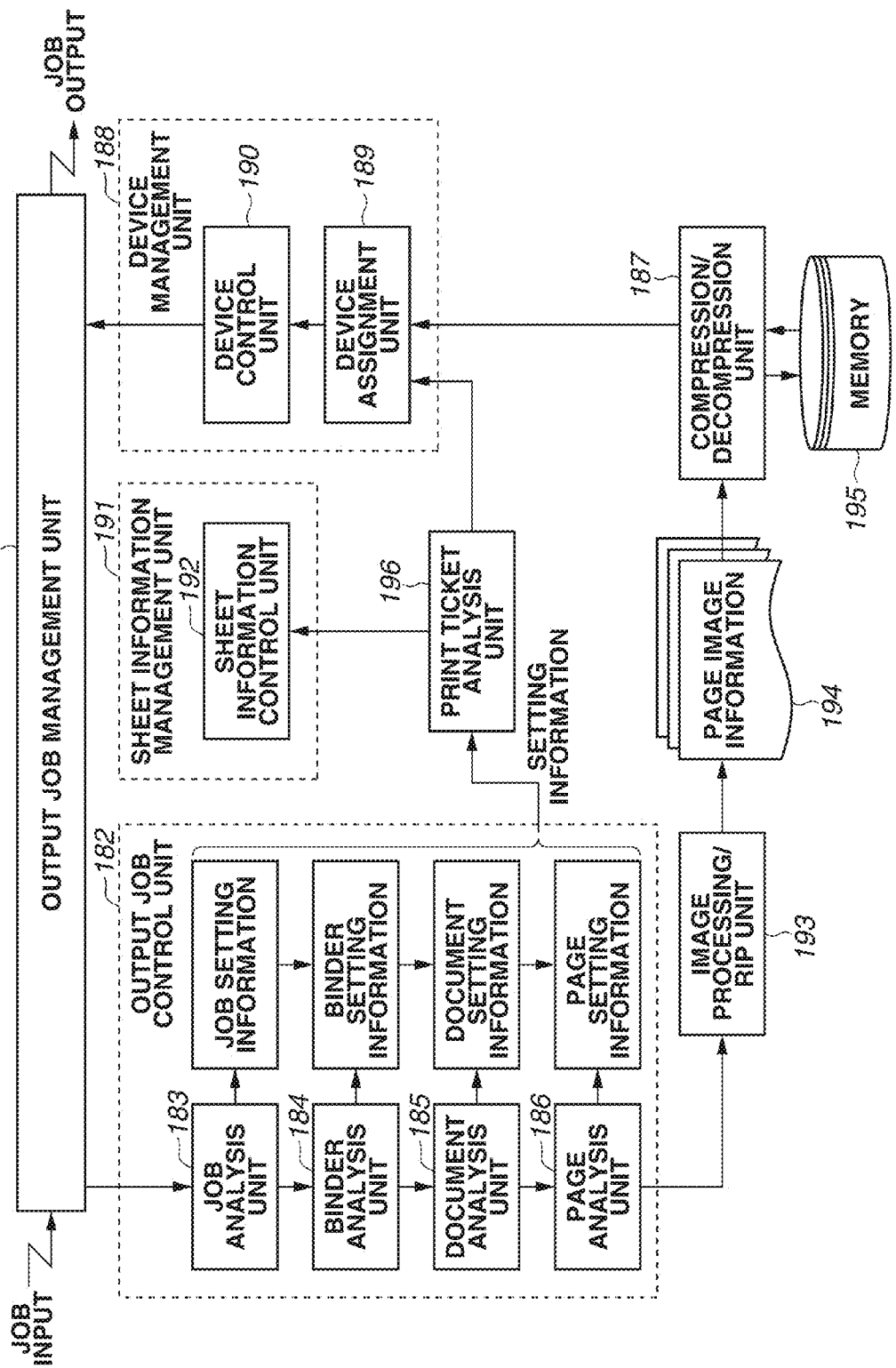
FIG. 4 is a block diagram illustrating page processing performed by the image forming apparatus illustrated in FIG. 1.

FIG. 4 is a block diagram illustrating page processing performed by the image forming apparatus illustrated in FIG. 1.

Referring to FIG. 4, an output job management unit 181 manages the print job input from the printer IF unit 340 (illustrated in FIG. 3), and controls reading and writing of the print job from and to a memory 195 and an processing order of the print job. An output job control unit 182 includes a job analysis unit 183, a binder analysis unit 184, a document analysis unit 185, and a page analysis unit 186, and generates setting information (so-called print ticket) and image information of the print job.

The job analysis unit 183 analyzes the details of entire setting information of a print job, such as a name of a document to be printed, the number of print copies, a specified sheet discharge tray which is an output destination, and a binding order of the print job that involves a plurality of binders, to generate print job setting information. The binder analysis unit 184 analyzes the details of entire setting information of a binder, such as a setting of a binding method, a position to be stapled, and a document order of a binder that involves a plurality of documents, to generate binder setting information.

The document analysis unit 185 analyzes the details of entire setting information of a document, such as a page order of the document that includes a plurality of pages, whether two-sided printing is selected, and an addition of a cover and a mount, to generate document setting information. The page analysis unit 186 analyzes the details of entire setting information of a page(s), such as a resolution of an image and an orientation of the image (landscape/portrait), to generate page setting information.

A sheet information management unit 191 manages information of a sheet type related to the print processing analyzed by the output job control unit 182. A sheet information control unit 192 generates a sheet information management table that indicates attribute information of the sheet type related to the print processing.

The present exemplary embodiment has described the processing performed by the output job management unit 181 and the sheet information management unit 191 as processing performed in the image forming apparatus, but the processing may be performed in a host computer. Alternatively, a print server that manages print jobs may be provided in a network between the host computer and the image forming apparatus, and the above-described job management processing may be performed in the print server.

When image information is to be generated, image processing for a scanned image is performed if the input data is a scanned image, and an image processing/RIP unit 193 is called to perform rendering if the input data is PDL data, so that a page image information 194 is generated. Data of the page image information 194 is compressed by a compression/decompression unit 187 and then the page image information 194 is associated with a scenario and the setting information and stored into the memory 195.

A device management unit 188 includes a device assignment unit 189 and a device control unit 190. The page image information 194 read out from the memory 195 together with the associated scenario and setting information is decompressed by the compression/decompression unit 187, and the scenario, the setting information, and the page image information 194 are input into the device management unit 188 as one set. The device assignment unit 189 serves as performing mediation between the devices that occurs if a plurality of print jobs is processed at the same time when assigning the devices according to the scenario. The device control unit 190 schedules which device and at which timing the image forming apparatus will use among the devices such as a printer and a post-processing unit.

<Print Processing Unit of Image Forming Apparatus>

Figure 5:
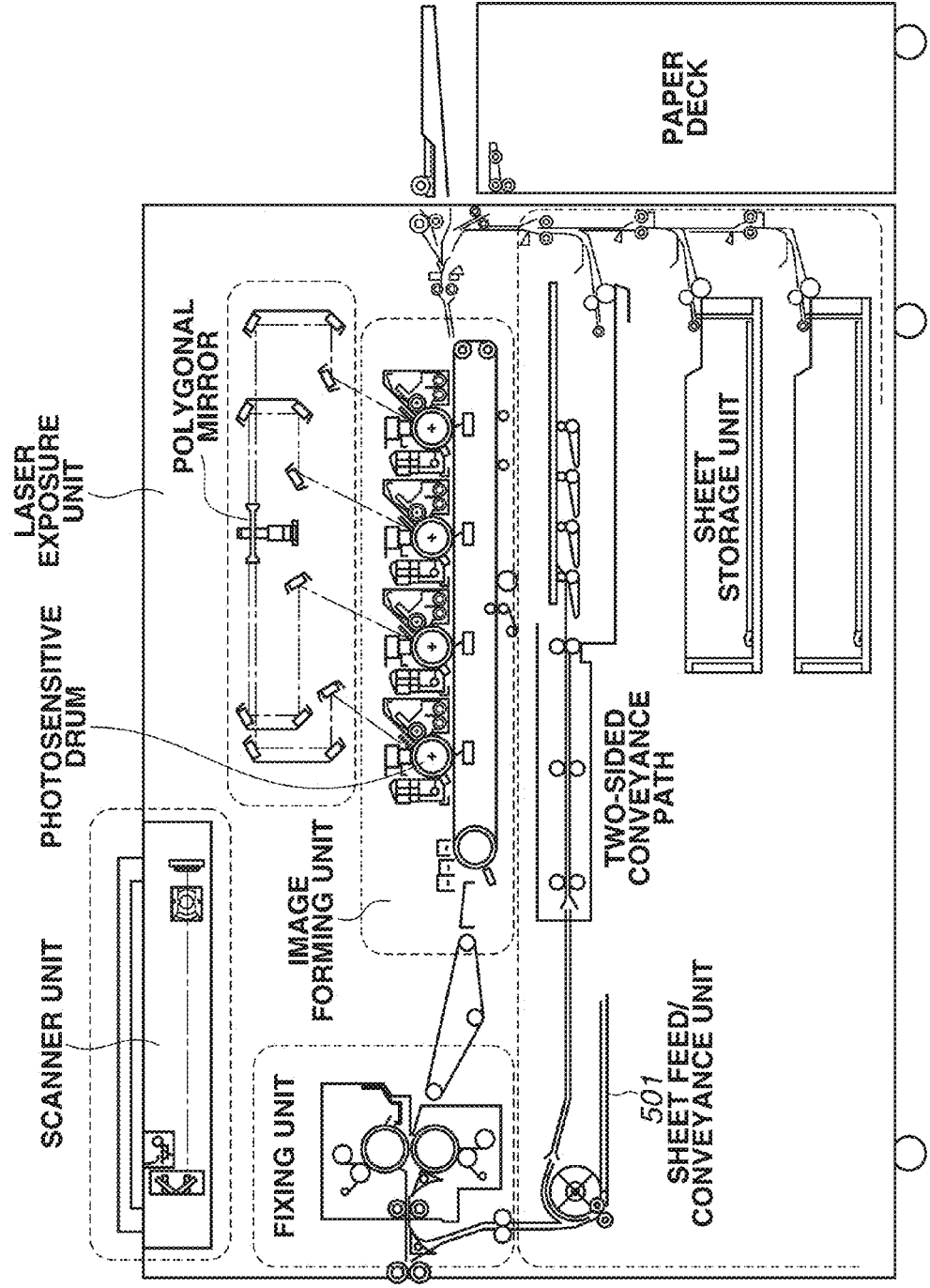
FIG. 5 is a cross-sectional view illustrating a configuration of the image forming apparatus.

FIG. 5 illustrates a configuration example of a four-drum (4D) color system printer (illustrated in FIG. 2). Referring to FIG. 5, the 4D color system printer includes a scanner unit, a laser exposure unit, photosensitive drums, an image forming unit, a fixing unit, a sheet feed/conveyance unit, and a printer control unit (not illustrated) that controls these units.

The scanner unit optically reads an image of a document by illuminating the document set on a document positioning plate, and converts the read image into an electric signal to generate image data. The laser exposure unit emits light such as laser light modulated according to the image data to a rotating polygon mirror, which rotates at a constant angular speed, to irradiate the photosensitive drum with the light reflected from the rotating polygon mirror as scanning light.

The image forming unit rotationally drives each of the photosensitive drums, charges the photosensitive drum using a charging device, develops a latent image formed on the photosensitive drum by the laser exposure unit with toner, and transfers the toner image onto a sheet. Further, the image forming unit collects a minute amount of toner remaining on the photosensitive drum without being transferred during the transfer. By including four developing units (developing stations) that perform a series of electrophotographic process described above, the image forming unit realizes image formation. The four developing units arranged in the order of cyan (C), magenta (M), yellow (Y), and black (K) sequentially perform operations of forming a magenta image, a yellow image, and a black image after a predetermined period of time has elapsed from the start of image formation at the cyan station. By this timing control, a full-color toner image is transferred onto the sheet without a color misregistration.

The fixing unit includes a combination of rollers and a belt, and includes a built-in heat source such as a halogen heater. The fixing unit melts the toner on the sheet, on which the toner image has been transferred by the image forming unit, with heat and pressure, thereby fixing the toner to the sheet.

The sheet feed/conveyance unit includes one or more sheet storage units represented by a sheet cassette and a paper deck, and separates one sheet from a plurality of sheets stored in the sheet storage unit to convey the sheet to the image forming unit and the fixing unit according to an instruction from the printer control unit. The toner images of the respective colors are transferred onto the conveyed sheet by the above-described developing units, and eventually, a full-color toner image is formed on the sheet. When images are to be formed on both sides of the sheet, the sheet that has passed through the fixing unit is guided into a two-sided conveyance path for conveying the sheet to the image forming unit again.

The printer control unit communicates with the image forming apparatus control unit, which controls the entire part of the image forming apparatus, to perform control according to an instruction therefrom, and also performs control so that the entire printer smoothly operates with the above-described scanner unit, laser exposure unit, image forming unit, fixing unit, and sheet feed/conveyance unit maintained in harmony with one another, while managing the states of the respective units.

Next, an overview of an operation of each of the units until the apparatus shifts from a powered-off state to a ready-to-operate state will be described. When the apparatus is powered on, the printer control unit instructs each of the scanner unit, the laser exposure unit, the image forming unit, the fixing unit, and the sheet feed/conveyance unit to start preparation operations, and waits to start communicating with the image forming apparatus control unit that manages the entire part of the image forming apparatus. Upon establishment of the communication with the image forming apparatus control unit, the printer control unit exchanges device specifications with the image forming apparatus control unit. After that, when the respective units complete their preparation operations, causing the printer to become ready for the image forming operation, the printer control unit notifies the image forming apparatus control unit that the printer is ready for the operation.

The printer control unit notifies the image forming apparatus control unit of the device states of the respective units. One example thereof will be described here. As the device state of the sheet feed/conveyance unit, the printer control unit detects a size of the sheets stored in the sheet storage unit, a remaining amount (stacking amount) of the sheets, and an operating state of a drive unit (whether the drive unit is operable or is at fault), and notifies the image forming apparatus control unit of these pieces of information. Further, as the device state of the image forming unit, the printer control unit notifies the image forming apparatus control unit of a remaining amount of toner in a toner container.

Furthermore, the following describes an overview of an operation of each of the units from when the printer becomes ready to start operation and the printer control unit is notified of an operation instruction from the image forming apparatus control unit until when the printer performs and completes a series of print operations.

The image forming apparatus control unit notifies the printer control unit of an operation start command. Upon receiving the operation start command, the printer control unit instructs each of the laser exposure unit, the image forming unit, the sheet feed/conveyance unit, and the fixing unit to start the print operations.

The laser exposure unit starts rotating a motor that drives the polygon mirror. The image forming unit rotationally drives and charges the photosensitive drums. The fixing unit turns on the fixing heater to increase a fixing temperature to a temperature that allows toner to be fixed to a sheet. The sheet feed/conveyance unit causes a driving motor to become ready to convey a sheet.

After the respective units complete their preparation operations, the printer control unit notifies the image forming apparatus control unit of completion of the preparation. Upon receiving the notification of the completion of the preparation, the image forming apparatus control unit instructs the printer control unit to perform the print operations on a page-by-page basis. For example, for a print job requiring ten pages and twenty copies, the image forming apparatus control unit instructs the printer control unit to perform the print operations for two hundred pages. Upon receiving the instruction for the print operations, the printer control unit instructs the sheet feed/conveyance unit to feed sheets.

If the sheet feed/conveyance unit is able to feed sheets, the sheet feed/conveyance unit feeds and conveys one sheet. When the sheet arrives at a predetermined position, the sheet feed/conveyance unit notifies the printer control unit of the arrival. For example, if no sheets are stored in the sheet storage unit, the sheet feed/conveyance unit notifies the printer control unit that the sheet feed/conveyance unit is not able to feed sheets.

Further, the sheet feed/conveyance unit may include, for example, a double feed detection sensor, which detects a double feed state in which sheets are conveyed while overlapping each other on a conveyance path, and a thickness detection sensor, which detects the sheet thickness. If these sensors detect the double feed state or any abnormality, the sheet feed/conveyance unit interrupts the sheet feed operation and the sheet conveyance operation, and notifies the printer control unit of the abnormality. Upon receiving the notification of the abnormality, the printer control unit notifies the image forming apparatus control unit of a cause for interrupting the operations, a position of a remaining sheet inside the apparatus, and the like.

Upon receiving a notification that the sheet has successfully been conveyed to reach the predetermined position, the printer control unit instructs the image forming unit to start forming an image according to the notification. By this timing control, a toner image is transferred onto the sheet.

The fixing unit monitors the fixing temperature, and adjusts the fixing temperature to an appropriate temperature. However, if a large amount of heat is consumed by the sheet, the fixing temperature may be reduced. In this case, the fixing unit notifies the printer control unit of the reduction in the fixing temperature. Upon receiving the notification, the printer control unit increases the sheet conveyance interval to prevent the fixing temperature from being further reduced. If the temperature of the fixing unit still does not recover, the printer control unit temporarily interrupts the operations, and resumes the operations after the fixing temperature returns to the appropriate temperature.

Upon completion of discharging all the sheets, the printer control unit instructs the respective units to stop the operations, receives operation stop notifications from the respective units, and notifies the image forming apparatus control unit of the completion of the operations. FIG. 5 illustrates two sheet storage units, but more sheet storage units can be connected and used depending on the configuration of the apparatus.

<Sheet Conveyance Path of Image Forming Apparatus>

Figure 6A:
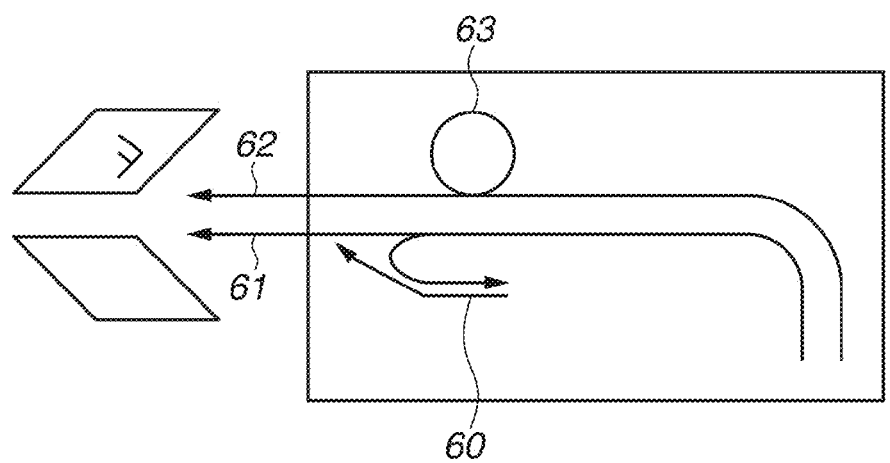
FIGS. 6A and 6B each illustrate how a fed sheet is conveyed.
Figure 6B:
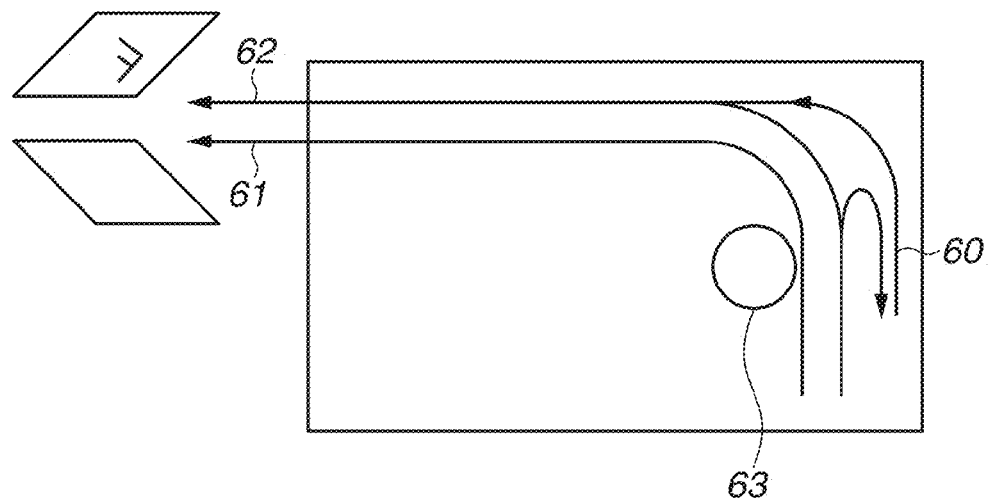

FIGS. 6A and 6B each illustrate an example of a sheet conveyance path and a print side of a sheet in the image forming apparatus illustrated in FIG. 5. There are several methods for conveying a sheet to increase the efficiency of the sheet conveyance path in the image forming apparatus. Two typical types of sheet conveyance paths and sheet discharge processes will be described with reference to FIGS. 6A and 6B.

FIG. 6A illustrates an example of the image forming apparatus that discharges a sheet face up when the sheet is conveyed via the shortest sheet conveyance path, and FIG. 6B illustrates an example of the image forming apparatus that discharges a sheet face down when the sheet is conveyed via the shortest sheet conveyance path. FIGS. 6A and 6B illustrate a sheet conveyance path 62 and a print side when an image is printed on a transparent sheet, and a sheet conveyance path 61 and a print side when an image is printed on a non-transparent sheet. FIGS. 6A and 6B further illustrate a photosensitive drum 63.

When the image forming apparatus illustrated in FIG. 6A performs print processing on a non-transparent sheet, the image forming apparatus discharges the sheet face down by performing processing for turning over the print side of the sheet via a reversing path 501 illustrated in FIG. 5 and a reversing path 60 illustrated in FIG. 6A. On the other hand, when the image forming apparatus illustrated in FIG. 6A performs print processing on a transparent sheet, the image forming apparatus reverses an image into a mirror image, and discharges the sheet face up without conveying the sheet via the reversing paths 501 and 60.

When the image forming apparatus illustrated in FIG. 6B performs print processing on a non-transparent sheet, the image forming apparatus discharges the sheet face down without conveying the sheet via the reversing path 501 illustrated in FIG. 5 and the reversing path 60 illustrated in 6B. On the other hand, when the image forming apparatus illustrated in FIG. 6B performs print processing on a transparent sheet, the image forming apparatus reverses an image into a mirror image, and discharges the sheet face up by conveying the sheet via the reversing paths 501 and 60.

If the sheet discharge processing is performed using the same path on both the transparent sheet and the non-transparent sheet, printing a document including the transparent sheet and the non-transparent sheet results in only the transparent sheet having an image in a horizontally reversed state.

Performing the processing for turning over the sheet surface separately for the transparent sheet and the non-transparent sheet allows the operator to turn a page without feeling inconvenient when referring to a document product including the transparent sheet and the non-transparent sheet. This method can also eliminate the processing in which the operator takes out only the transparent sheet from the document product to turn over the page. The non-transparent sheet is also conveyed through the sheet conveyance path 62 and the reversing path 60 depending on the sheet discharge surface and finishing type that are specified for a print job.

<Configuration of Printing System Via Network>

Figure 7:
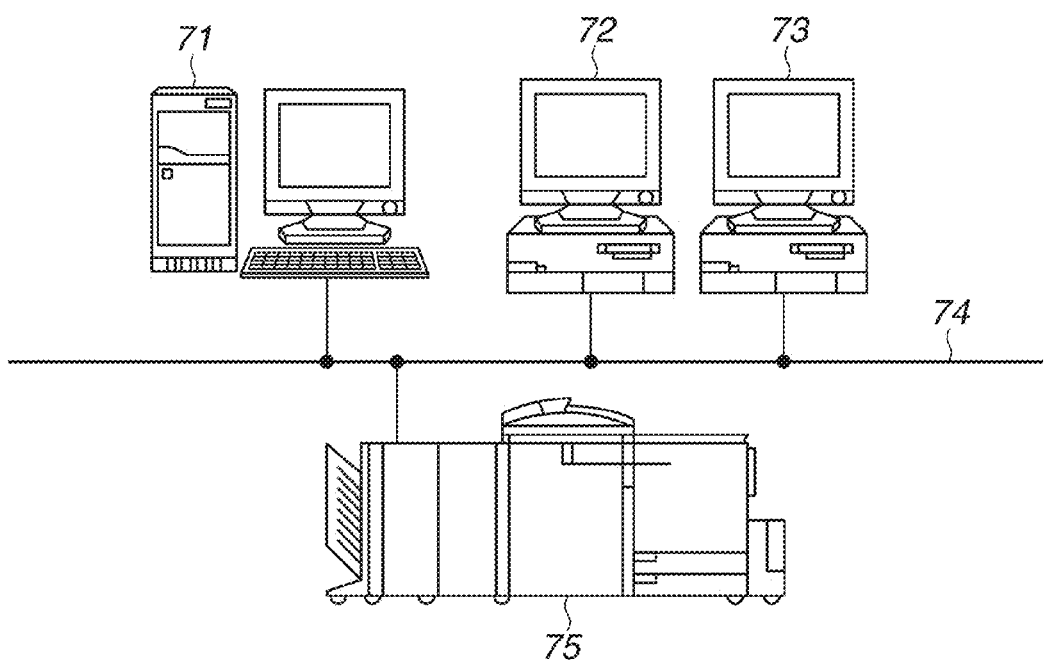
FIG. 7 illustrates a printing system.

FIG. 7 illustrates a configuration of a printing system including the printing apparatus.

Referring to FIG. 7, an image forming apparatus 75 can be connected to host computers 72 and 73 via a network 74. In the following description, the host computers are not limited thereto, and the image forming apparatus 75 is configured to be able to be connected to a large number of host computers.

A print server 71 manages input print jobs and the image forming apparatus 75 connected thereto via the network 74. The print server 71 can monitor a state of the image forming apparatus 75 connected thereto and statuses of all print jobs, and can also perform control such as temporarily stopping a print job, changing a setting, resuming printing, or copying, moving, and deleting a job. The network 74 allows data transmission and reception to and from the host computers 72 and 73 and the image forming apparatus 75, and exchange of a command with the host computers 72 and 73 and the image forming apparatus 75.

<Configuration of Operation Unit of Image Forming Apparatus>

A configuration of the operation unit 210 (illustrated in FIG. 2) of the image forming apparatus 75 will be described with reference to FIGS. 8 and 9.

Figure 8:
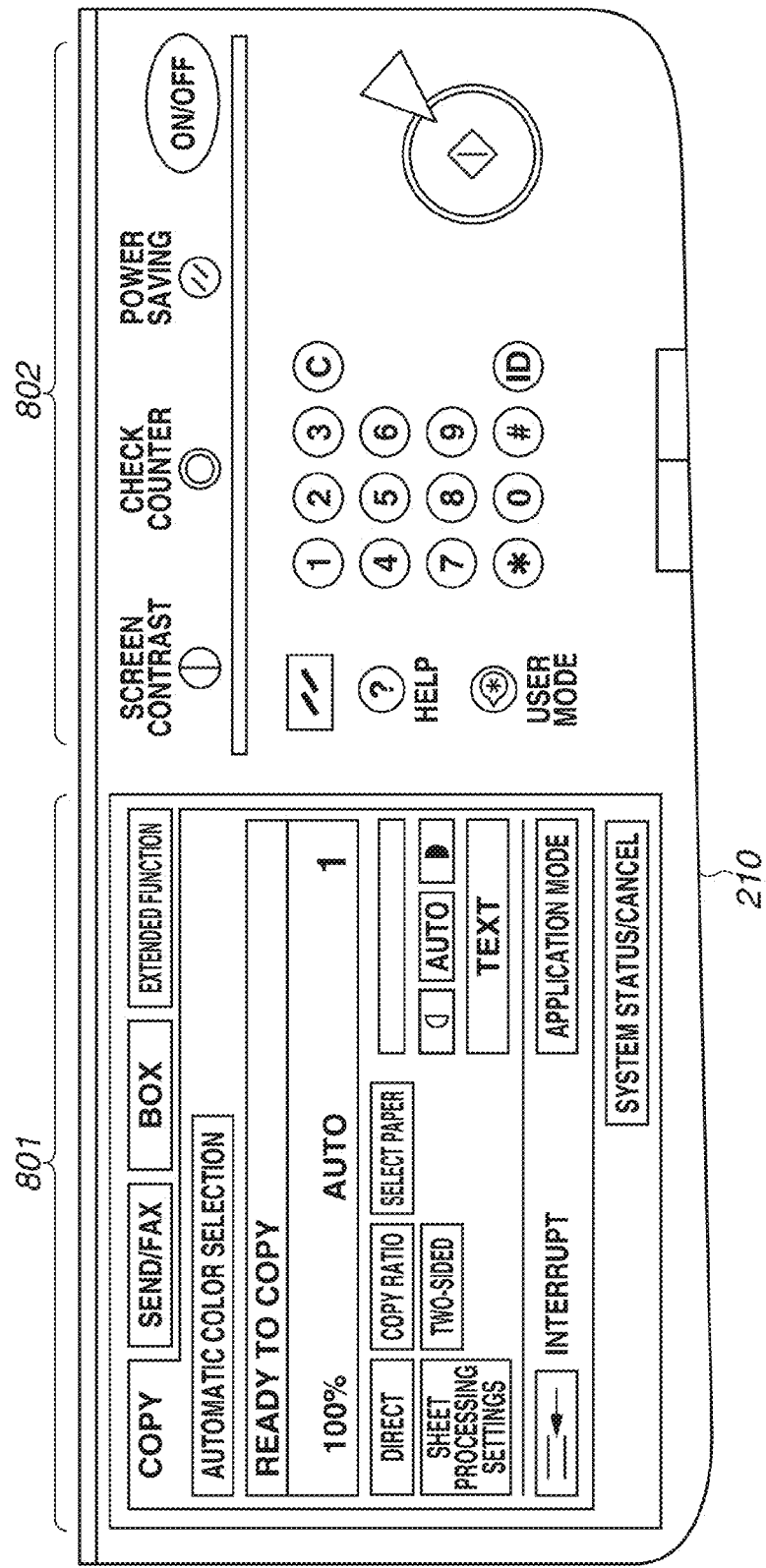
FIG. 8 is a plan view illustrating an operation unit included in the image forming apparatus.
Figure 9:
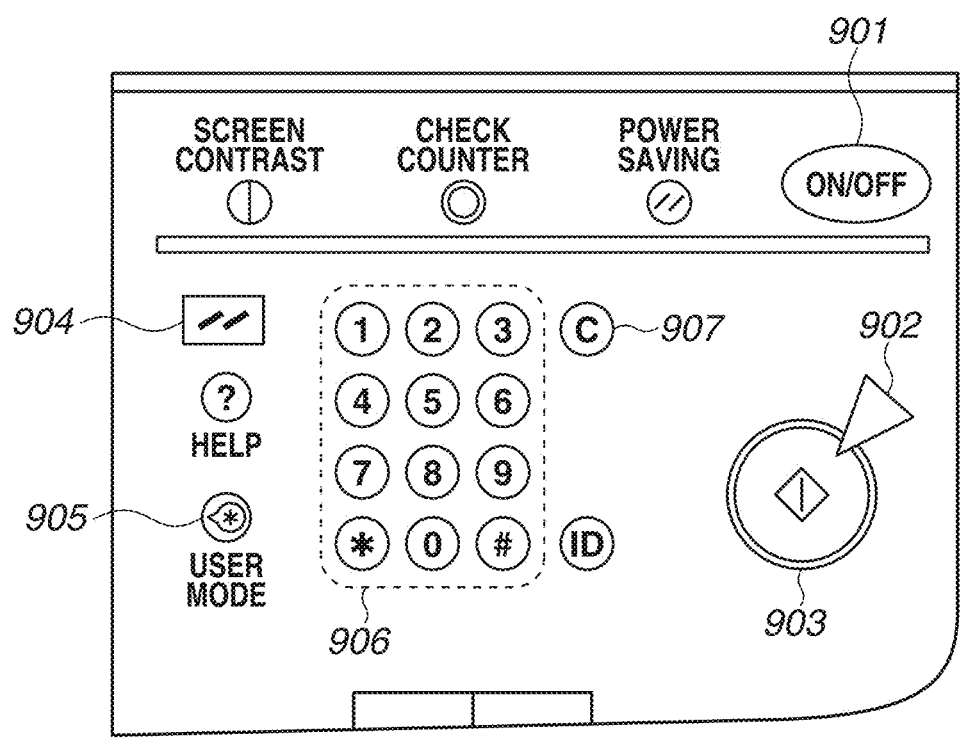
FIG. 9 is a plan view illustrating the operation unit included in the image forming apparatus.

As illustrated in FIG. 8, the operation unit 210 includes a key input unit 802 that can receive an operation performed with hard keys by an operator, and a touch panel unit 801 as an example of a display unit that can receive an operation performed with soft keys (display keys) by an operator. Further, as illustrated in FIG. 9, the key input unit 802 includes a power switch 901. In response to an operation performed by the operator on the power switch 901, the CPU 205 performs control to selectively switch between a standby mode and a sleep mode. The standby mode is a normal operating state, and the sleep mode is a state in which the image forming apparatus 75 stops the program in a state of waiting for an interruption for network printing, facsimile, and the like to save power consumption.

The CPU 205 performs control so that the image forming apparatus 75 can receive an operation performed by the operator on the power switch 901 when a main power switch (not illustrated), which supplies power to the entire system, is turned on. A start key 903 allows the image forming apparatus 75 to receive from the operator an instruction for causing the printing apparatus to start job processing according to a type of a processing target job specified by the operator, such as a copying operation and a transmission operation. A stop key 902 allows the image forming apparatus 75 to receive from the operator an instruction for causing the printing apparatus to interrupt the processing on the received job.

A numerical keypad 906 allows the operator to set register numbers for various kinds of settings. A clear key 907 clears various kinds of parameters such as the register numbers set by the operator via the numerical keypad 906. A reset key 904 is used to receive from the operator an instruction for canceling all the various kinds of settings set for the processing target job by the operator, and returning the set values to their default states. A user mode key 905 is used to shift to a system setting screen.

Figure 10:
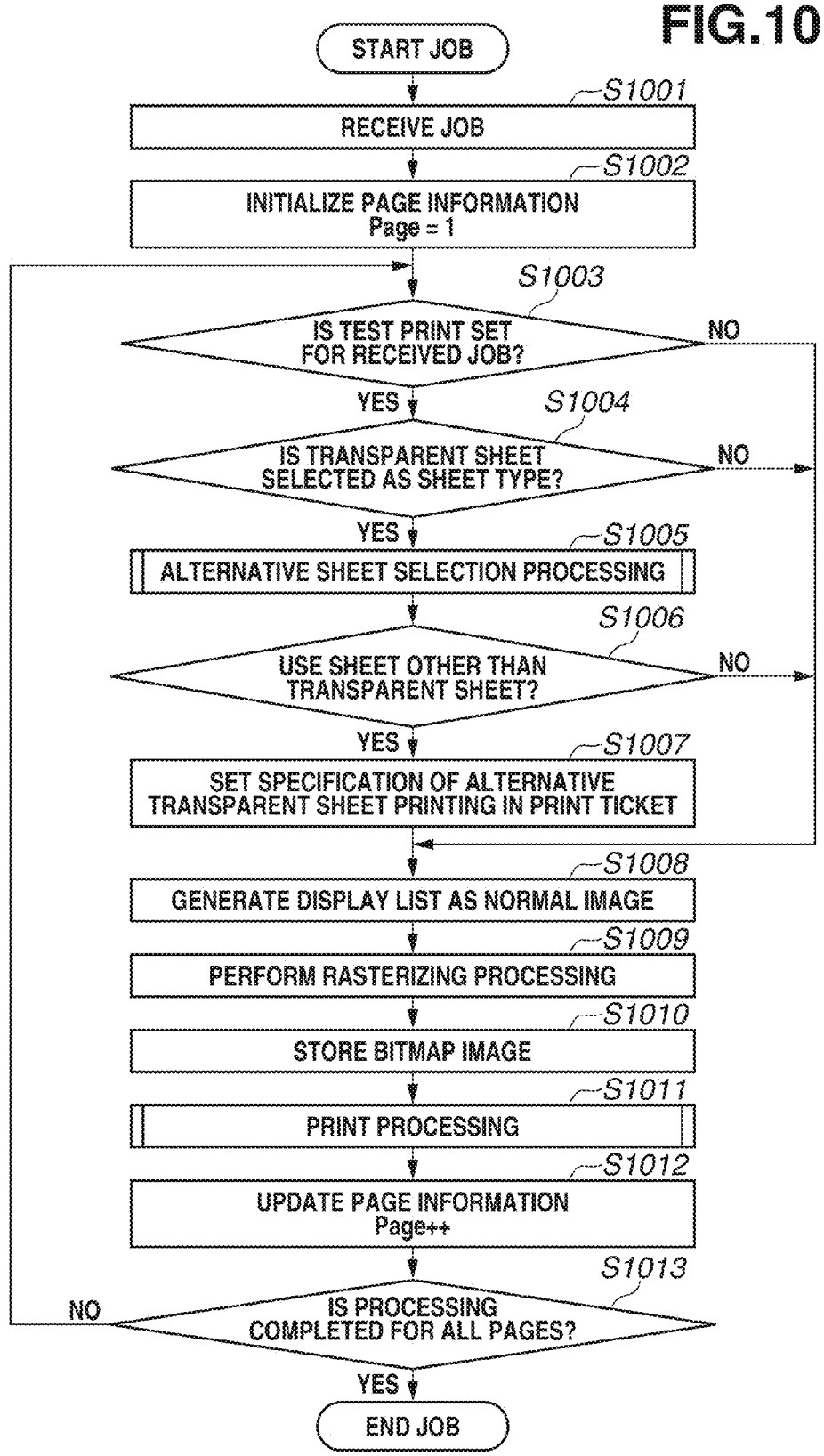
FIG. 10 is a flowchart illustrating a method for controlling the printing apparatus.
Figure 14A:
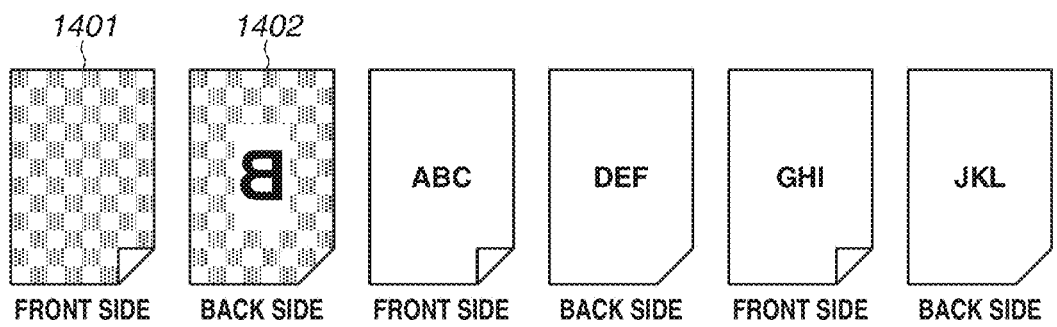
FIGS. 14A and 14B each schematically illustrate a print result.
Figure 14B:
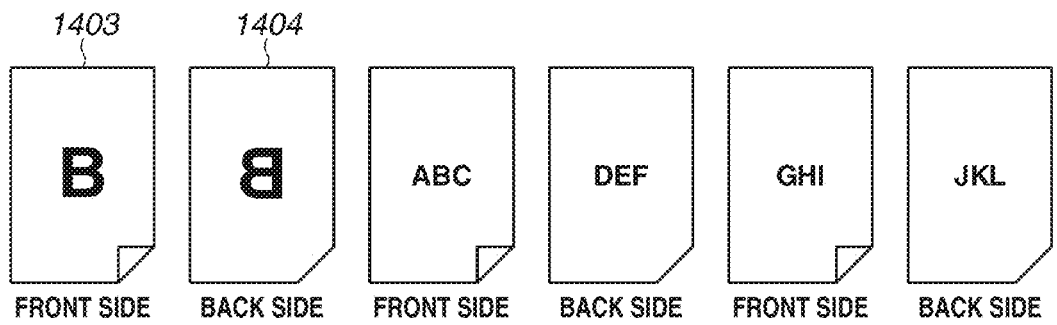

The following describes a control program and processing performed by the image forming apparatus 75 when performing the image formation processing on a non-transparent recording medium as an alternative to the image formation processing on a transparent recording medium (transparent sheet), with reference to FIGS. 10, 14A, and 14B.

FIG. 13 illustrates examples of user interface (UI) screens displayed on the operation unit 210 illustrated in FIG. 8. Each of UI screens 1301 and 1302 illustrated in FIG. 13 is an example of an operation screen displayed by a printing system control program according to the present exemplary embodiment.

Further, FIG. 14A illustrates an example of a product obtained when a transparent recording medium is used, and FIG. 14B illustrates an example of a product obtained when the image formation processing is performed on a non-transparent recording medium as an alternative to the image formation processing on the transparent recording medium.

<Job Processing by Printing System>

FIG. 10 is a flowchart illustrating a method for controlling the printing apparatus according to the present exemplary embodiment. This example includes the following processing. The first processing is processing for inputting an image formation job and then replacing the transparent recording medium specified for the job with a non-transparent recording medium. The second processing is display list generation processing and rasterizing processing that are performed when the setting is changed to the non-transparent recording medium. The third processing is image formation processing. The CPU 205 executes the stored control program, by which each of the steps is realized. The control procedure will be described below assuming that the modules illustrated in FIG. 3, which are the control programs executed by the CPU 205, are main control units.

In step S1001, in the printing system illustrated in FIG. 7, the image forming apparatus 75 receives a print job from the host computer 72 or 73 connected via the printer IF 340 illustrated in FIG. 3. Next, the image forming apparatus 75 performs the following processing on the received job by using the PDL analysis unit 304 and the print control unit 360 illustrated in FIG. 3. First, in step S1002, at the start of the processing, the PDL analysis unit 304 initializes the page information (Page) for managing a processing status of the job. Because PDL data is processed page by page, in step S1012, the PDL analysis unit 304 adds the page information one page by one page.

Next, in step S1003, the PDL analysis unit 304 checks whether test print is set for the received job. If the PDL analysis unit 304 determines that test print is set (YES in step S1003), in step S1004, the PDL analysis unit 304 determines a sheet type selected for a processing target page. If the PDL analysis unit 304 determines that a transparent sheet is selected (YES in step S1004), in step S1005, the PDL analysis unit 304 performs alternative sheet selection processing, which will be described below.

Next, in step S1006, the PDL analysis unit 304 determines whether a sheet other than the transparent sheet is selected by the alternative sheet selection processing. If the PDL analysis unit 304 determines that a sheet other than the transparent sheet is selected (YES in step S1006), in step S1007, the PDL analysis unit 304 sets the specification of alternative transparent sheet printing in a print ticket. The specification of the alternative transparent sheet printing set in the print ticket is referred to when performing image conversion processing and switching a function related to execution of printing during print processing (described below).

Next, in step S1008, the PDL analysis unit 304 analyzes PDL contained in the job to generate a display list. In step S1009, the data rendering unit 305 performs rasterizing processing to generate a bitmap image. In step S1010, the generated bitmap image is stored into the memory 195 illustrated in FIG. 4, which is a data storage area, so as to be transmitted to the print control unit 360. In step S1011, the print control unit 360 performs print processing.

Next, in step S1012, the PDL analysis unit 304 updates the page information. In step S1013, the PDL analysis unit 304 determines whether the page subjected to the processing is the last page in the job. If the page is the last page (YES in step S1013), the processing ends. If the PDL analysis unit 304 determines that the page is not the last page (NO in step S1013), the processing from steps S1003 to S1012 is repeated until the processing is completed on the last page.

<Print Processing>

Figure 11:
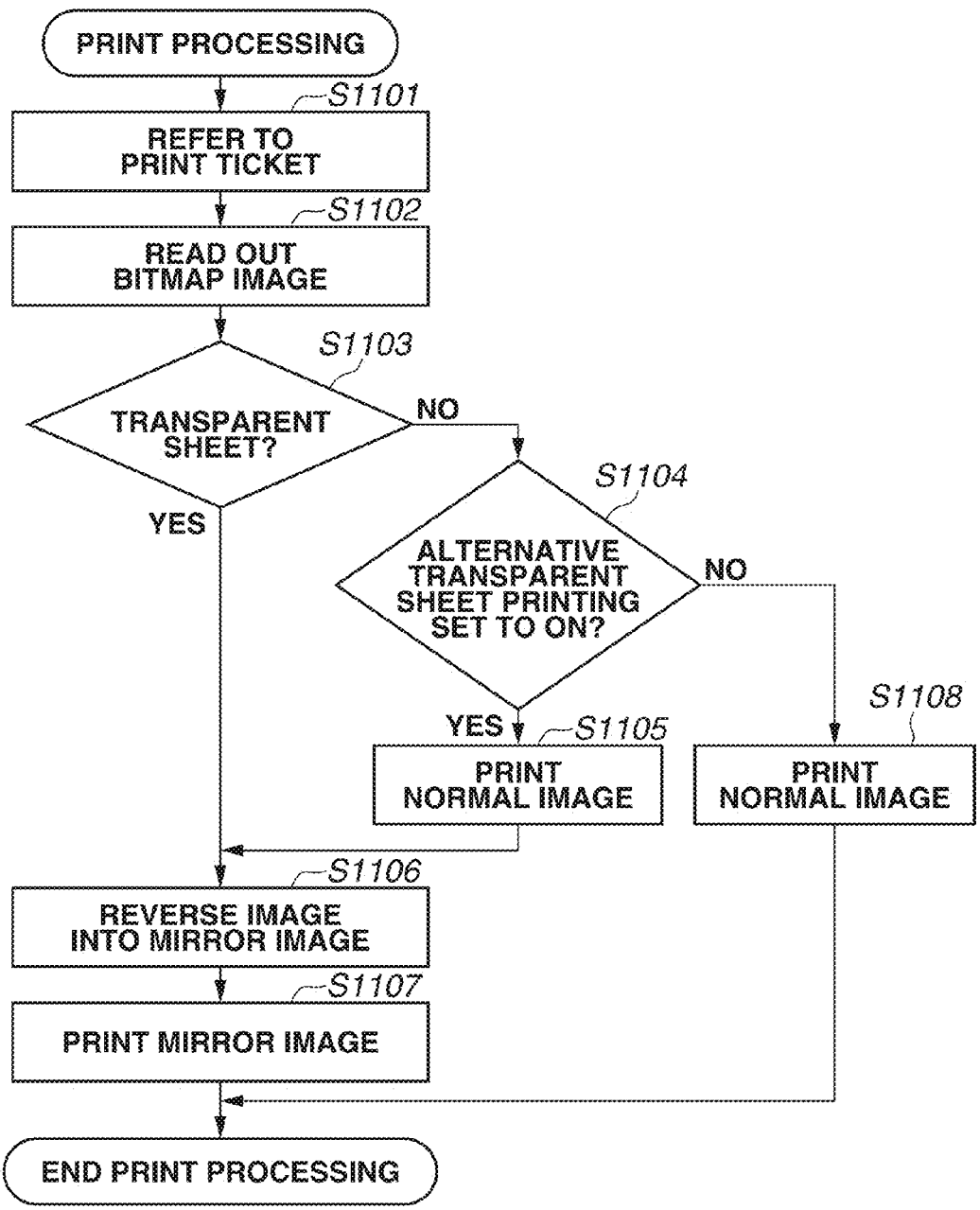
FIG. 11 is a flowchart illustrating a method for controlling the printing apparatus.

FIG. 11 is a flowchart illustrating a method for controlling the printing apparatus according to the present exemplary embodiment. This flowchart is an example of the print processing (step S1011 illustrated in FIG. 10) performed when the image forming apparatus 75 performs the image formation processing according to the type of recording medium specified for a page. The control procedure will be described below assuming that the modules illustrated in FIG. 3, which are the control programs executed by the CPU 205, are main control units. In step S1101, the print control unit 360 refers to the print ticket in step S1007 to acquire various kinds of information required for the image formation processing. Examples of the information acquired at this time include the sheet size, the sheet type, and whether to perform finishing processing. Next, in step S1102, the print control unit 360 reads out the bitmap image stored in step S1010 from the non-volatile storage device. In step S1103, the print control unit 360 determines whether a transparent sheet is selected as the sheet type based on the information acquired by referring to the print ticket in step S1101. If the print control unit 360 determines that a transparent sheet is not selected (NO in step S1103), in step S1104, the print control unit 360 determines whether alternative transparent sheet printing is set to ON. If the print control unit 360 determines that alternative transparent sheet printing is set to ON (YES in step S1104), the print control unit 360 prints the bitmap image read out from the storage area in step S1102, on a front side of the sheet as a normal image. If the print control unit 360 determines that alternative transparent sheet printing is not set to ON (NO in step S1104), the processing proceeds to step S1108. In step S1108, the print control unit 360 prints the bitmap image read out from the storage area in step S1102, on the front side of the sheet as a normal image.

In step S1106, the image edit processing unit 220 illustrated in FIG. 2 performs mirror-reversed processing on the bitmap image read out from the storage area in step S1102. In step S1107, the print control unit 360 prints a mirror image obtained by the mirror-reversed processing on a back side of the sheet.

<Alternative Sheet Selection Processing>

Figure 12:
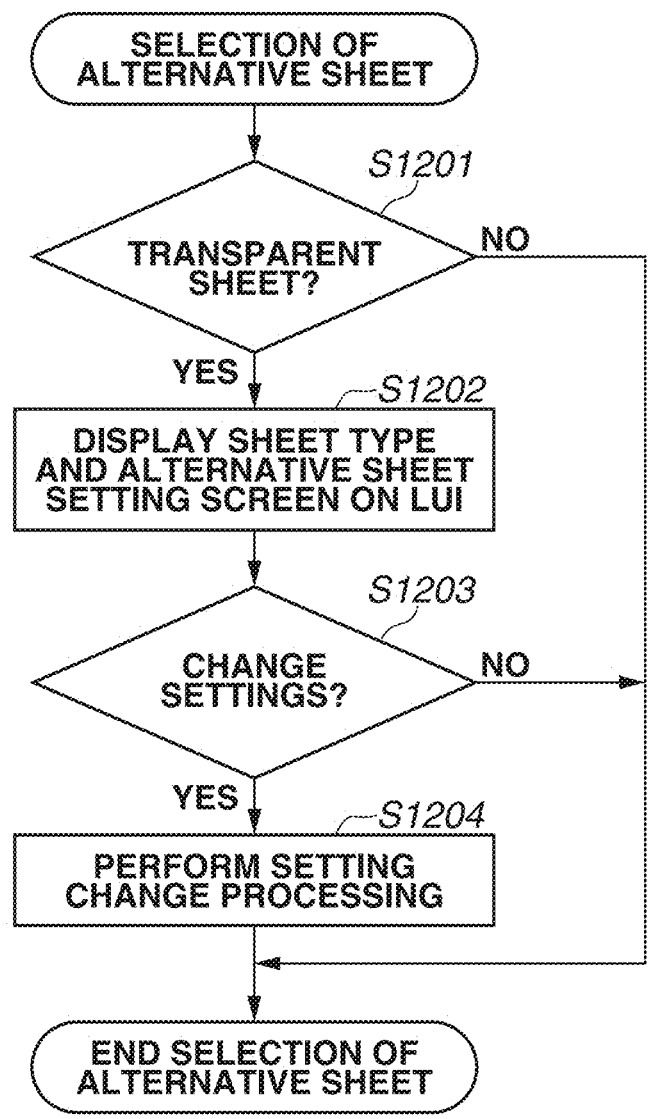
FIG. 12 is a flowchart illustrating a method for controlling the printing apparatus.

FIG. 12 is a flowchart illustrating a method for controlling the printing apparatus according to the present exemplary embodiment. The present example corresponds to the alternative sheet selection processing described in step S1005 illustrated in FIG. 10, and corresponds to an example of processing for changing the print settings via the operation screen illustrated in FIGS. 13A and 13B. The control procedure will be described below assuming that the modules illustrated in FIG. 3, which are the control programs executed by the CPU 205, are main control units.

In step S1201, the PDL analysis unit 304 determines whether a special transparent recording medium such as a transparent sheet is selected. If the PDL analysis unit 304 determines that a transparent sheet is selected (YES in step S1201), the processing proceeds to step S1202. Then, in step S1202, a screen indicating information of the sheet type and the sheet size selected for the page being processed, and a setting change screen for changing the settings for the sheet are displayed on the operation panels 801 and 802 illustrated in FIG. 8, which is included in the image forming apparatus 75.

Each of the UI screens 1301 and 1302 illustrated in FIGS. 13A and 13B, respectively indicates an example of a screen configuration in this case. Next, if the operator changes the settings via the operation unit 210 (YES in step S1203), in step S1204, the PDL analysis unit 304 overwrites the sheet information required for the page processing with the setting information input via the operation unit 210.

The present exemplary embodiment is effective when the image formation processing on a transparent recording medium, such as a transparent sheet and a transparent film, includes performing test print for a job that uses a special sheet requiring a mirror image to be printed on the back side of the recording medium.

In other words, the print control unit 360 is provided with a function of generating a normal image for front-side printing and a mirror image for back-side printing when alternatively using a general recording medium (the present exemplary embodiment describes plain paper as an example thereof) instead of the transparent recording medium.

This allows the operator to obtain a similar product to a product that would be obtained by forming an image on the replaced transparent recording medium, and to check the printed position and the finished quality after finishing processing. As a result, the operator can obtain the product allowing the operator to check the finished quality at low cost.

FIG. 14A illustrates an example of the image formation processing performed on a transparent recording medium, and FIG. 14B illustrates an example of the image formation processing performed on a non-transparent recording medium as an alternative to the image formation processing on the transparent recording medium. FIG. 14A schematically indicates that no image is formed on a front side 1401 of the transparent sheet and a mirror-reversed image is formed on a back side 1402 of the transparent sheet by the image formation processing. On the other hand, FIG. 14B schematically indicates that a normal image is formed on a front side 1403 of the non-transparent sheet by the image formation processing and a mirror-reversed image is formed on a back side 1404 of the non-transparent sheet by the image formation processing.

The present exemplary embodiment has been described assuming that the control programs run on the image forming apparatus 75 illustrated in FIG. 7. However, the control programs can be configured to run on the print server 71 or the host computer 72 or 73.

The first exemplary embodiment has described the processing for alternatively using another recording medium instead of the transparent recording medium and the image formation processing at the time of the alternative use processing in the case of a job requiring one-sided printing on the transparent recording medium. A second exemplary embodiment will describe processing performed when two-sided printing is performed, with reference to flowcharts illustrated in FIGS. 15 and 16. Assume that the second exemplary embodiment has similar functions to <Print Processing> and <Alternative Sheet Selection Processing> described in the first exemplary embodiment.

<Job Processing by Printing System>

Figure 15:
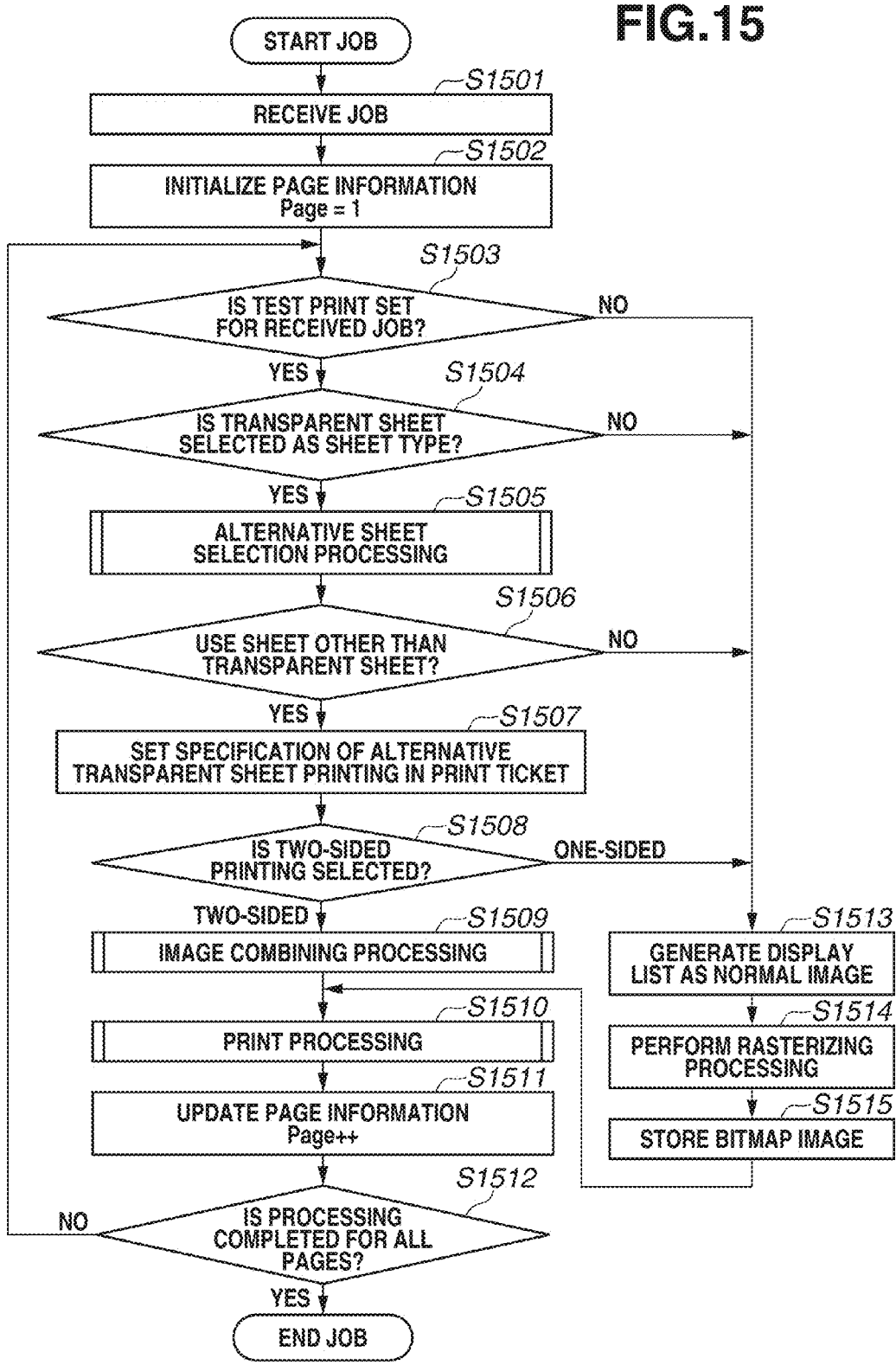
FIG. 15 is a flowchart illustrating a method for controlling the printing apparatus.

FIG. 15 is a flowchart illustrating a method for controlling the printing apparatus according to the present exemplary embodiment. The control procedure will be described below assuming that the modules illustrated in FIG. 3, which are the control programs executed by the CPU 205, are main control units. Now, the present exemplary embodiment will describe the following example. When the image forming apparatus 75 is set to perform test print, the image forming apparatus 75 combines a normal image of a page that is to be printed on a first side of a transparent sheet, and a mirror image of a next page that is to be printed on a second side thereof, which is a back side of the first side. Then, the image forming apparatus 75 prints the combined image on a first side of an alternative sheet fed instead of the transparent sheet. Then, the image forming apparatus 75 turns over the alternative sheet. After turning over the alternative sheet, the image forming apparatus 75 combines the mirror image of the page that is to be printed on the second side of the transparent sheet, and the normal image of the previous page that is to be printed on the first side thereof, which is the back side of the second side. Further, the image forming apparatus 75 prints the combined image on the second side of the alternative sheet and then discharge it.

In step S1501, the image forming apparatus 75 receives a print job from the host computer 72 or 73 illustrated in FIG. 7 connected via the printer IF 340 illustrated in FIG. 3. Next, the image forming apparatus 75 performs the following processing on the received print job by using the PDL analysis unit 304 and the print control unit 360 illustrated in FIG. 3.

First, in step S1502, at the start of the processing, the PDL analysis unit 304 initializes the page information (Page) for managing a processing status of the print job. Because PDL data is processed page by page, in step S1511, the PDL analysis unit 304 adds the page information one page by one page. In the present exemplary embodiment, the image forming apparatus 75 combines images of two pages for which two-sided printing is selected, whereby, in step S1605 illustrated in FIG. 16, the PDL analysis unit 304 further adds one page during image combining processing, which will be described below, only when two-sided printing is selected.

Next, in step S1503, the PDL analysis unit 304 determines whether test print is set for the received job. If the PDL analysis unit 304 determines that test print is set (YES in step S1503), in step S1504, the PDL analysis unit 304 determines a sheet type selected for a processing target page. If the PDL analysis unit 304 determines that a transparent sheet is selected in step S1504 (YES in step S1504), in step S1505, the PDL analysis unit 304 performs alternative sheet selection processing.

Next, in step S1506, the PDL analysis unit 304 determines whether a sheet other than the transparent sheet is selected by the alternative sheet selection processing. If the PDL analysis unit 304 determines that a sheet other than the transparent sheet is selected (YES in step S1506), in step S1507, the PDL analysis unit 304 sets the specification of alternative transparent sheet printing in a print ticket. Further, in step S1508, the PDL analysis unit 304 determines whether two-sided printing is selected. If the PDL analysis unit 304 determines that two-sided printing is selected (TWO-SIDED in step S1508), in step S1509, the image edit processing unit 220 performs image combining processing. After completion of the image combining processing, in step S1510, the print control unit 360 performs print processing. Next, in step S1511, the PDL analysis unit 304 updates the page information. In step S1512, the PDL analysis unit 304 determines whether the page subjected to the processing is the last page in the job. If the page subjected to the processing is the last page (YES in step S1512), the processing ends. If the page subjected to the processing is not the last page (NO in step S1512), the processing from steps S1503 to S1515 is repeated until the processing is completed on the last page.

On the other hand, if the PDL analysis unit 304 determines that two-sided printing is not selected in step S1508 (ONE-SIDED in step S1508), in step S1513, the PDL analysis unit 304 analyzes PDL contained in the job to generate a display list. In step S1514, the data rendering unit 305 performs rasterizing processing to generate a bitmap image. In step S1515, the generated bitmap image is stored into the memory 195 illustrated in FIG. 4, which is a data storage area, so as to be transmitted to the printer engine unit 370. In step S1510, the print control unit 360 performs print processing.

<Image Combining Processing>

FIG. 16 is a flowchart illustrating a method for controlling the printing apparatus according to the present exemplary embodiment. The present example corresponds to a detailed procedure of the image combining processing performed in step S1509 illustrated in FIG. 15. The control procedure will be described below assuming that the modules illustrated in FIG. 3, which are the control programs executed by the CPU 205, are main control units.

If the PDL analysis unit 304 determines that two-sided printing is selected in step S1508 (TWO-SIDED in step S1508), in step S1601, the PDL analysis unit 304 refers to the page information of a processing target page, and stores the page information into a variable N. Next, in step S1602, the PDL analysis unit 304 analyzes PDL of the N-th page to generate a display list. In step S1603, the data rendering unit 305 performs rasterizing processing to generate a bitmap image. In step S1604, the generated bitmap image is stored into the memory 195 illustrated in FIG. 4, which is a data storage area, so as to be transmitted to the printer engine unit 370. In step S1605, the PDL analysis unit 304 updates the page information in preparation for performing the PDL analysis processing on the next page.

Next, in step S1606, the PDL analysis unit 304 analyzes PDL of the N+1-th page to generate a display list. In step S1607, the data rendering unit 305 performs rasterizing processing to generate a bitmap image. In step S1608, the generated bitmap image is stored into the memory 195 illustrated in FIG. 4, which is a data storage area, so as to be transmitted to the printer engine unit 370.

Next, in step S1609, the image edit processing unit 220 performs image combining processing for superimposing the bitmap image of the N-th page and the bitmap image of the N+1-th page generated by the data rendering unit 305 in steps S1603 and S1607, respectively. In step S1610, the combined image is stored into the memory 195 illustrated in FIG. 4, which is a non-volatile data storage area.

The present exemplary embodiment is effective when the image formation processing on a transparent recording medium, such as a transparent sheet and a transparent film, includes the processing for alternatively using another recording medium instead of the transparent recording medium in the case of a job requiring two-sided image formation processing.

In other words, the present exemplary embodiment provides a function of, when alternatively using a general recording medium (the present exemplary embodiment describes plain paper as an example thereof) instead of a transparent recording medium, combining an image for front-side printing as a normal image and an image for back-side printing as a normal image and then performing image formation processing on both sides of the sheet. This allows the operator to obtain a similar product to a product that would be created by forming images on the replaced transparent recording medium, and to check the printed position and the finished quality after finishing processing. Further, the operator can obtain the product that allows the operator to check the finished quality at low cost.

Figure 17A:
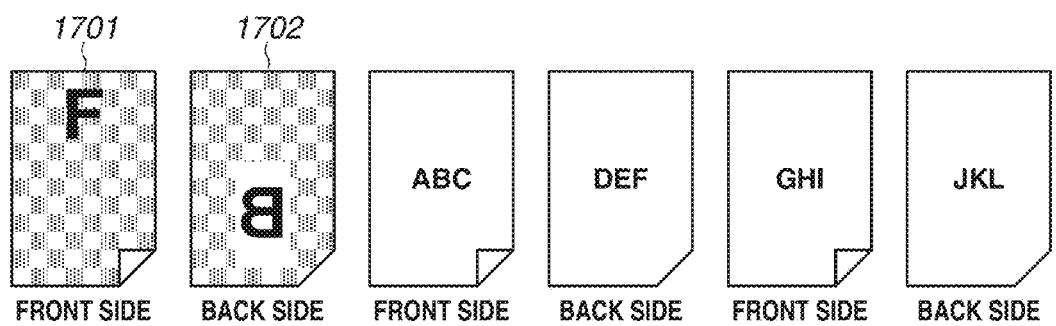
FIGS. 17A and 17B each schematically illustrate a print result.
Figure 17B:
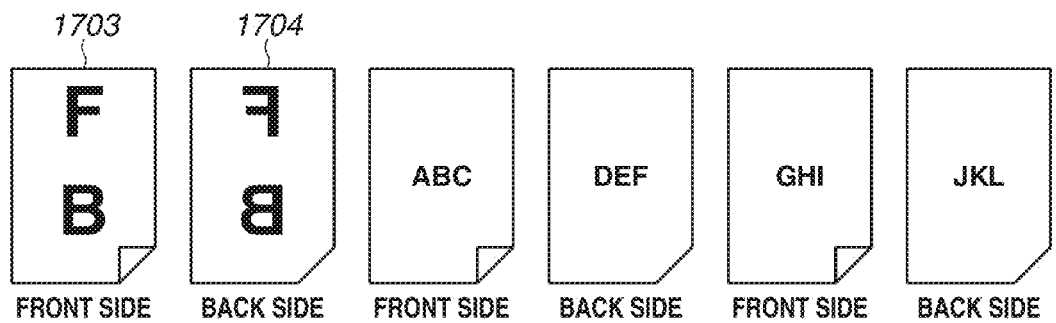

FIG. 17A illustrates an example of the image formation processing performed on a transparent recording medium, and FIG. 17B illustrates an example of the image formation processing performed on a non-transparent recording medium as an alternative to the image formation processing on the transparent recording medium.

FIG. 17A schematically indicates that a normal image is formed on a front side 1701 of the transparent sheet by the image formation processing and a mirror-reversed image is formed on a back side 1702 of the transparent sheet by the image formation processing. On the other hand, FIG. 17B illustrates an example of the image formation processing performed when a non-transparent sheet is alternatively used instead of the transparent sheet, and schematically indicates that the images illustrated on the front side 1701 and the back side 1702 are combined and the combined image is formed on a front side 1703 of the non-transparent sheet as a normal image by the image formation processing. Further, a back side 1704 represents the back side of the non-transparent sheet when it is alternatively used instead of the transparent sheet, and FIG. 17B schematically indicates that a mirror image generated by horizontally reversing the combined image of the images illustrated on the front side 1701 and the back side 1702 is formed on the back side 1704 by the image formation processing.

Figure 18:
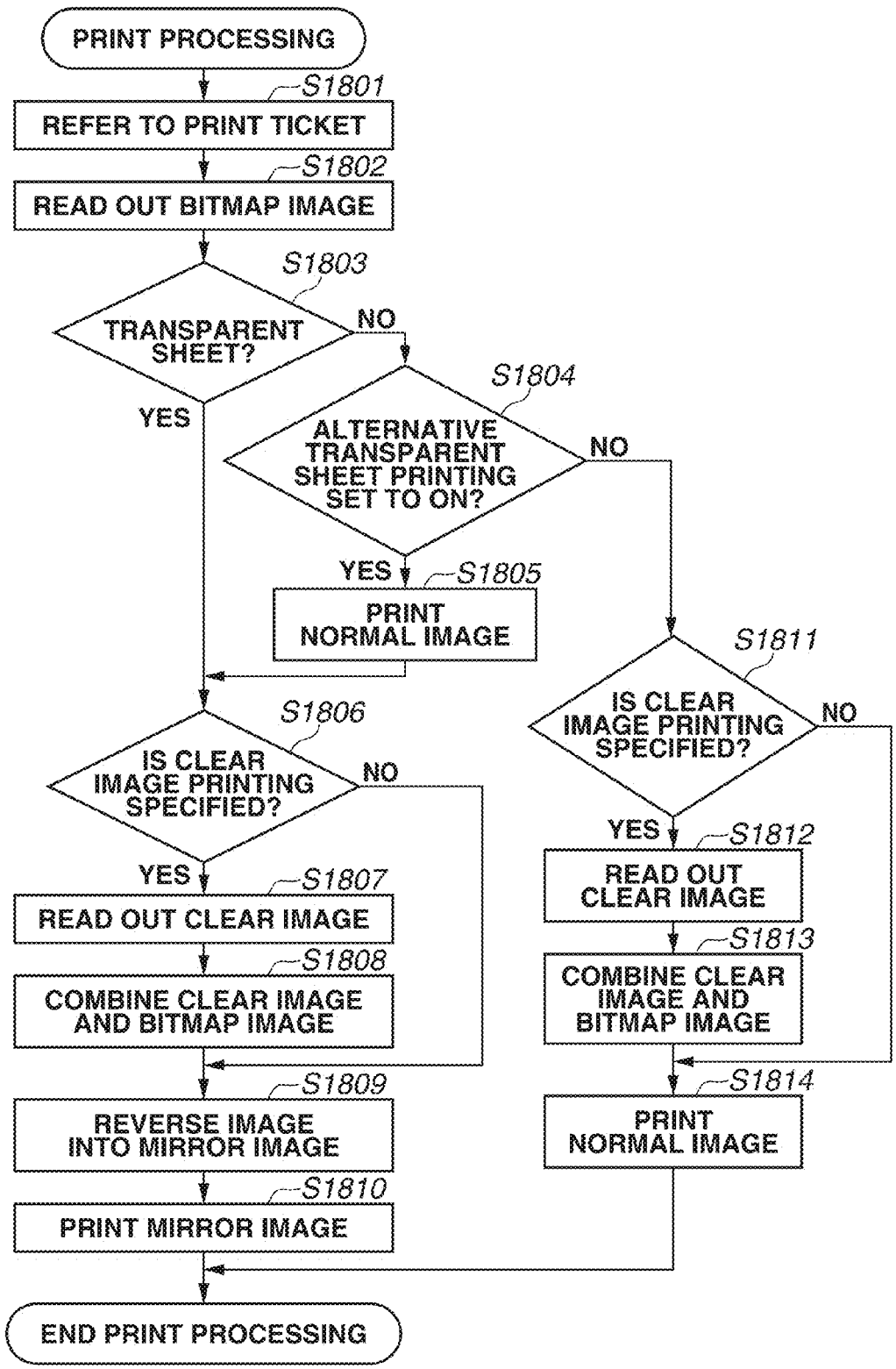
FIG. 18 is a flowchart illustrating a method for controlling the printing apparatus.

A third exemplary embodiment will describe processing performed when the image forming apparatus 75 uses a clear image, which is an image formed with a highly transparent special recording material, with reference to a flowchart illustrated in FIG. 18. Assuming that a bitmap image used in clear image formation processing is stored in a non-volatile storage device in advance, the bitmap image will not be explicitly described in the present exemplary embodiment. Further, assume that the job processing, except that for a clear image, performed by the printing system has similar functions to <Job Processing by Printing System> and <Alternative Sheet Selection Processing> described in the first exemplary embodiment.

<Print Processing>

FIG. 18 is a flowchart illustrating a method for controlling the printing apparatus according to the present exemplary embodiment. The present example corresponds to a detailed procedure of the image combining processing performed in step S1509 illustrated in FIG. 15. The control procedure will be described below assuming that the modules illustrated in FIG. 3, which are the control programs executed by the CPU 205, are main control units.

In step S1801, the print control unit 360 refers to the print ticket to acquire various kinds of information required for image formation processing. Examples of the information acquired at this time include the sheet size, the sheet type, and whether to perform finishing processing. Next, in step S1802, the print control unit 360 reads out the bitmap image stored during the job processing (in step S1010) from the non-volatile storage device. Further, in step S1803, the print control unit 360 determines whether a transparent sheet is selected as the sheet type based on the information acquired by referring to the print ticket in step S1801. If the print control unit 360 determines that a transparent sheet is not selected (NO in step S1803), in step S1804, the print control unit 360 determines whether alternative transparent sheet printing is set to ON. If the print control unit 360 determines that alternative transparent sheet printing is set to ON (YES in step S1804), in step S1805, the print control unit 360 prints the bitmap image read out from the storage area in step S1802 on the front side of the sheet as a normal image.

Further, in step S1806, the print control unit 360 determines whether a command for printing a clear image is issued. If the print control unit 360 determines that a command for printing a clear image is issued (YES in step S1806), in step S1807, the print control unit 360 reads out the clear image specified in the print ticket from the non-volatile storage area.

Next, in step S1808, the image edit processing unit 220 illustrated in FIG. 2 combines the clear image read out in step S1807 and the bitmap image read out in step S1802. Further, in step S1809, the image edit processing unit 220 performs mirror-reversed processing on the combined image generated by the image edit processing unit 220. Then, in step S1810, the print control unit 360 prints a mirror image generated by the mirror-reversed processing on the back side of the sheet.

On the other hand, if the print control unit 360 determines that alternative transparent sheet printing is not set to ON in step S1804 (NO in step S1804), in step S1811, the print control unit 360 determines whether a command for printing a clear image is issued. If a command for printing a clear image is issued (YES in step S1811), the print control unit 360 reads out the clear image specified in the print ticket from the non-volatile storage area.

Next, in step S1813, the image edit processing unit 220 illustrated in FIG. 2 combines the clear image read out in step S1812 and the bitmap image read out in step S1802. In step S1814, the print control unit 360 prints the combined image on the front side of the sheet.

The present exemplary embodiment is effective when the image formation processing on a transparent recording medium, such as a transparent sheet and a transparent film, includes the processing for alternatively using another recording medium instead of the transparent recording medium in the case of a job used for the clear image formation processing for forming an image with a highly transparent special recording material.

In other words, the present exemplary embodiment provides a function of, when alternatively using a general recording medium (the present exemplary embodiment describes plain paper as an example thereof) instead of a transparent recording medium, generating a normal image without a clear image combined thereto for front-side printing, and combining the clear image and the normal image and converting the combined image into a mirror image for back-side printing.

This allows the operator to obtain a similar product to a product that would be created by forming an image on the replaced transparent recording medium, and to check the printed position and the finished quality after finishing processing. Further, the operator can obtain the product that allows the operator to check the finished quality at low cost.

Figure 19A:
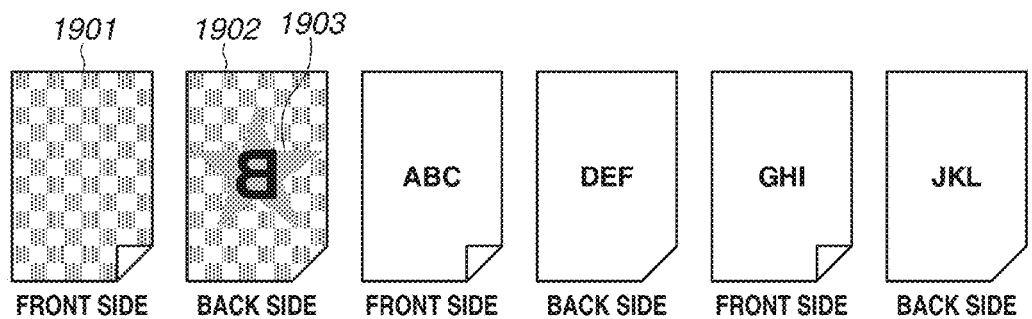
FIGS. 19A and 19B each schematically illustrate a print result.
Figure 19B:
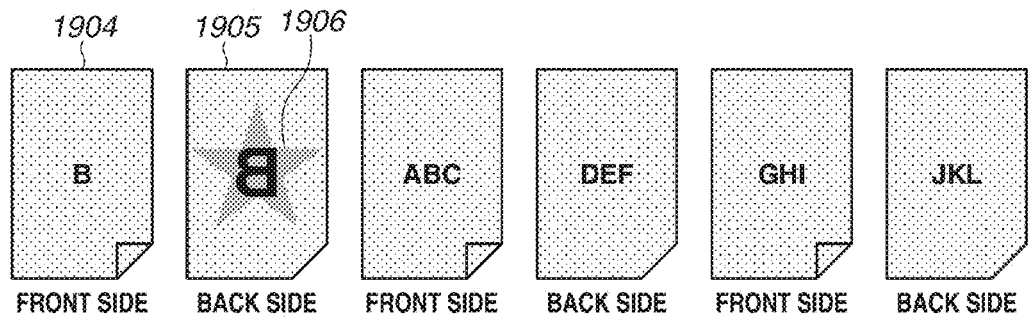

FIG. 19A illustrates an example of the image formation processing performed on a transparent recording medium, and FIG. 19B illustrates an example of the image formation processing performed on a non-transparent medium as an alternative to the image formation processing on the transparent recording medium.

Having described various exemplary embodiments in detail, one skilled in the art will appreciate that the spirit and the scope of the present invention are not limited to the specific description and the drawings of the present invention, and cover various modifications and changes made to the contents described in the claims of the present disclosure.

Further, an exemplary embodiment of the present invention can be also realized as, for example, a system, an apparatus, a method, a program, or a storage medium. More specifically, an exemplary embodiment of the present invention may be applied to a system including a plurality of devices, and may also be applied to an apparatus including only a single device.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-094765 filed May 1, 2014, which is hereby incorporated by reference herein in its entirety.

What is claimed is:

1. A printing apparatus comprising:
   a reception unit configured to receive a setting of test print;
   a control unit configured to perform control to print an image as a mirror image on a second side of a transparent sheet if the reception unit does not receive the setting of the test print, and perform control to feed an alternative sheet instead of the transparent sheet to print the image as a normal image on a first side of the alternative sheet if the reception unit receives the setting of the test print; and
   a determination unit configured to determine whether two-sided printing is set,
   wherein the control unit performs control to combine an image for a first side of the transparent sheet as a normal image and an image for the second side of the transparent sheet as a normal image, and to print the combined image on the first side of the alternative sheet, if the reception unit receives the setting of the test print and the determination unit determines that the two-sided printing is set.

2. The printing apparatus according to claim 1, wherein the control unit performs control to print the image as the normal image on the first side of the alternative sheet and further print the image as the mirror image on a second side of the alternative sheet, if the reception unit receives the setting of the test print.

3. The printing apparatus according to claim 1, further comprising a display unit configured to display a setting screen for setting a type of the alternative sheet,
   wherein the control unit performs control to feed the alternative sheet according to the type set on the setting screen displayed by the display unit.

4. The printing apparatus according to claim 1, wherein the control unit performs control to combine the image for the first side of the transparent sheet as the normal image and the image for the second side of the transparent sheet as the normal image to generate a first combined image and then print the first combined image on the first side of the alternative sheet, and to combine the image for the first side of the transparent sheet as a mirror image and the image for the second side of the transparent sheet as a mirror image to generate a second combined image and then print the second combined image on a second side of the alternative sheet, if the reception unit receives the setting of the test print and the determination unit determines that the printing apparatus is set to perform the two-sided printing.

5. A method for controlling a printing apparatus, the method comprising:
   receiving a setting of test print;

performing control to print an image as a mirror image on a second side of a transparent sheet if the setting of the test print is not received, and performing control to feed an alternative sheet instead of the transparent sheet to print the image as a normal image on a first side of the alternative sheet if the setting of the test print is received; and determining whether two-sided printing is set, wherein an image for a first side of the transparent sheet as a normal image and an image for the second side of the transparent sheet as a normal image is combined, and the combined image is printed on the first side of the alternative sheet, if the setting of the test print is received and it is determined that the two-sided printing is set.

6. A non-transitory computer-readable storage medium storing a program for causing a computer to perform a method for controlling a printing apparatus, the method comprising:

receiving a setting of test print;

performing control to print an image as a mirror image on a second side of a transparent sheet if the setting of the test print is not received, and performing control to feed an alternative sheet instead of the transparent sheet to print the image as a normal image on a first side of the alternative sheet if the setting of the test print is received; and determining whether two-sided printing is set, wherein an image for a first side of the transparent sheet as a normal image and an image for the second side of the transparent sheet as a normal image is combined, and the combined image is printed on the first side of the alternative sheet, if the setting of the test print is received and it is determined that the two-sided printing is set.

* * * * *